United States Patent [19]
Bell

[11] 3,893,088
[45] July 1, 1975

[54] RANDOM ACCESS MEMORY SHIFT REGISTER SYSTEM

[75] Inventor: Antony G. Bell, Houston, Tex.
[73] Assignee: Texas Instruments Incorporated, Dallas, Tex.

[22] Filed: Apr. 11, 1974
[21] Appl. No.: 460,259

Related U.S. Application Data

[63] Continuation of Ser. No. 163,682, July 19, 1971, abandoned.

[52] U.S. Cl. .......... 340/173 R; 307/221 R
[51] Int. Cl. .......... G11c 7/00; G11c 19/00
[58] Field of Search .......... 307/238, 221 R, 221 B, 307/221 C; 340/173 R, 173 CA, 173 FF, 173 RC

[56] References Cited

UNITED STATES PATENTS

| | | | |
|---|---|---|---|
| 2,823,368 | 2/1958 | Avery | 340/173 CA |
| 2,825,889 | 3/1958 | Henle | 340/173 CA |
| 3,174,106 | 3/1965 | Urban | 307/221 R |
| 3,313,926 | 4/1967 | Minnick | 307/221 R |
| 3,504,353 | 3/1970 | Guzak | 307/238 X |
| 3,585,613 | 6/1971 | Palfi | 340/173 R |
| 3,588,847 | 6/1971 | Dell | 340/173 R |
| 3,651,491 | 3/1972 | Kabayashi | 340/173 FF |
| 3,761,898 | 9/1973 | Pao | 340/173 R |

OTHER PUBLICATIONS

Anacker, Memory Employing Integrated Circuit Shift Register Rings, 6/68, IBM Technical Disclosure Bulletin, Vol. II, No. 1, pp. 12–13a.

Beausoleil, Shift Register Storage, 10/70, IBM Technical Disclosure Bulletin, Vol. 13, No. 5, pp. 1336–1337.

*Primary Examiner*—Stuart N. Hecker
*Attorney, Agent, or Firm*—Harold Levine; Edward J. Connors, Jr.; John G. Graham

[57] ABSTRACT

A random access memory array wherein each storage cell includes an input, an output, a write control and a read control is coupled to a commutator system, the random access memory array is thereby operated by the commutator system to provide a shift register system. Various embodiments of the random access memory shift register system of the invention provide many advantages over conventional shift register systems including flexibility; high, low or variable speed; high density; and low power.

16 Claims, 17 Drawing Figures

RANDOM ACCESS MEMORY SHIFT REGISTER SYSTEM

This is a continuation of application Ser. No. 163,682, filed July 19, 1971, now abandoned.

This invention relates to shift register systems and the like and, more particularly, to a shift register which utilizes a random access memory array or a portion thereof as a shift register system to store and shift coded information.

Many shift register systems for storing and shifting binary information are available. It is an object of this invention to provide a shift register system which is more flexible than conventional shift register systems. It is also an object of this invention to provide a highly stable electronic shift register system which is denser than conventional shift register systems to store and shift a greater number of bits of coded information in a given area. For example, in accordance with the present invention, an MOS (metal-insulator-semiconductor) embodiment of the shift register system of the invention fabricated as an integrated semiconductor system requires approximately one-third of the area required by conventional MOS shift registers to store and shift an equal number of bits of binary information or can store and shift three times the number of bits of binary information which is stored and shifted in a conventional shift register of equal area. Another object of the invention is to provide a highly stable shift register which is independent of speed considerations. A further object of the invention is to provide an electronic shift register system which requires lower operating power than conventional shift registers. Still another object of the invention is to provide a unique logic and/or arithmetic system.

These and other objects are accomplished in accordance with the present invention by utilizing a random access memory array coupled to and operated in conjunction with a commutator system. The memory array is comprised of a plurality of memory cells capable of storing coded information, arranged in rows and columns. Each memory cell includes input means for introducing coded information into the memory cell, output means for reading information out of the memory cell, write control means for addressing the memory cell in order to write coded information into the memory cell in order to read coded information out of the memory cell. Within each row of cells, the write control means are commoned and the read control means are commoned; within each column of cells, the input means are commoned and the output means are commoned. Furthermore, in one embodiment of the invention, the write control means of rows are commoned to the read control means of adjacent rows. In still another embodiment, the output means of columns are commoned with the input means of adjacent columns. The commutator system provides pulses to the write and read control means or to commoned write and read control means of rows of memory cells to sequentially operate rows of cells in the array and thereby provide a shift register system in accordance with the invention.

Still further objects and advantages of the invention will be apparent from the following detailed description and claims and from the accompanying drawings illustrative of various embodiments of the invention wherein:

Figure 13:
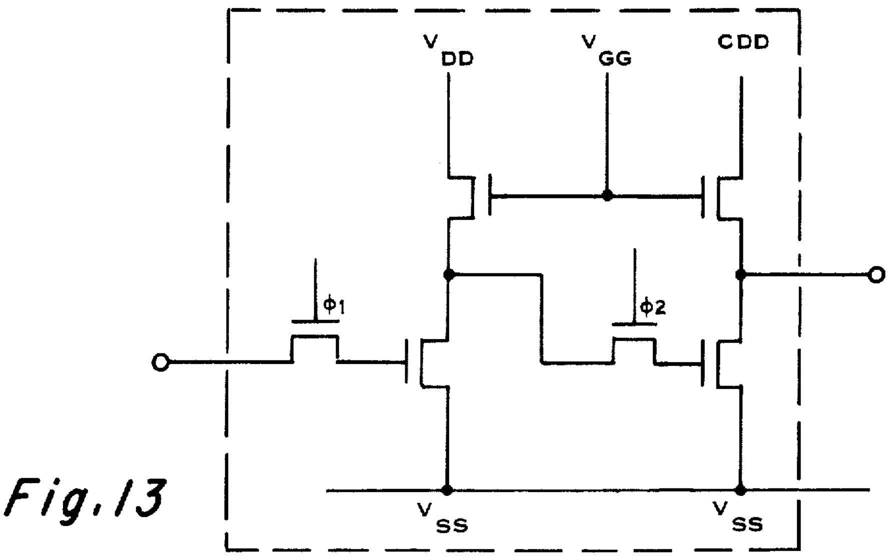

FIGS. 10A–12B are circuit diagrams and structure representations of MOS or MIS embodiment of memory cells 10 comprising memory array 13; and FIG. 13 is a circuit diagram of an MOS or MIS embodiment of delay cells 12.

In accordance with the present invention a shift register system comprises a random access memory array, coupled to and operated in conjunction with a commutator system. The memory array is comprised of a plurality of memory cells capable of storing coded information, arranged in rows and columns. Each memory cell includes input means for introducing coded information into the memory cell, output means for reading information out of the memory cell, write control means for addressing the memory cell in order to write coded information into the memory cell, and read control means for addressing the memory cell in order to read coded information out of the memory cell. Within each row of cells, the write control means are commoned and the read control means are commoned; within each column of cells, the input means are commoned, and the output means are commoned. The commutator system sequentially distributes pulses to the write and read control means of rows to sequentially operate the rows of cells in the array and thereby provide the shift register system. In some embodiments of the invention, as is shown in the following detailed discussion of various embodiments of the shift register system, a unit of coded information such as a binary bit is stored in a cell and is not necessarily shifted through the memory array, but appears as a string of shifting coded information at the input and output lines of the shift register system.

Figure 1:
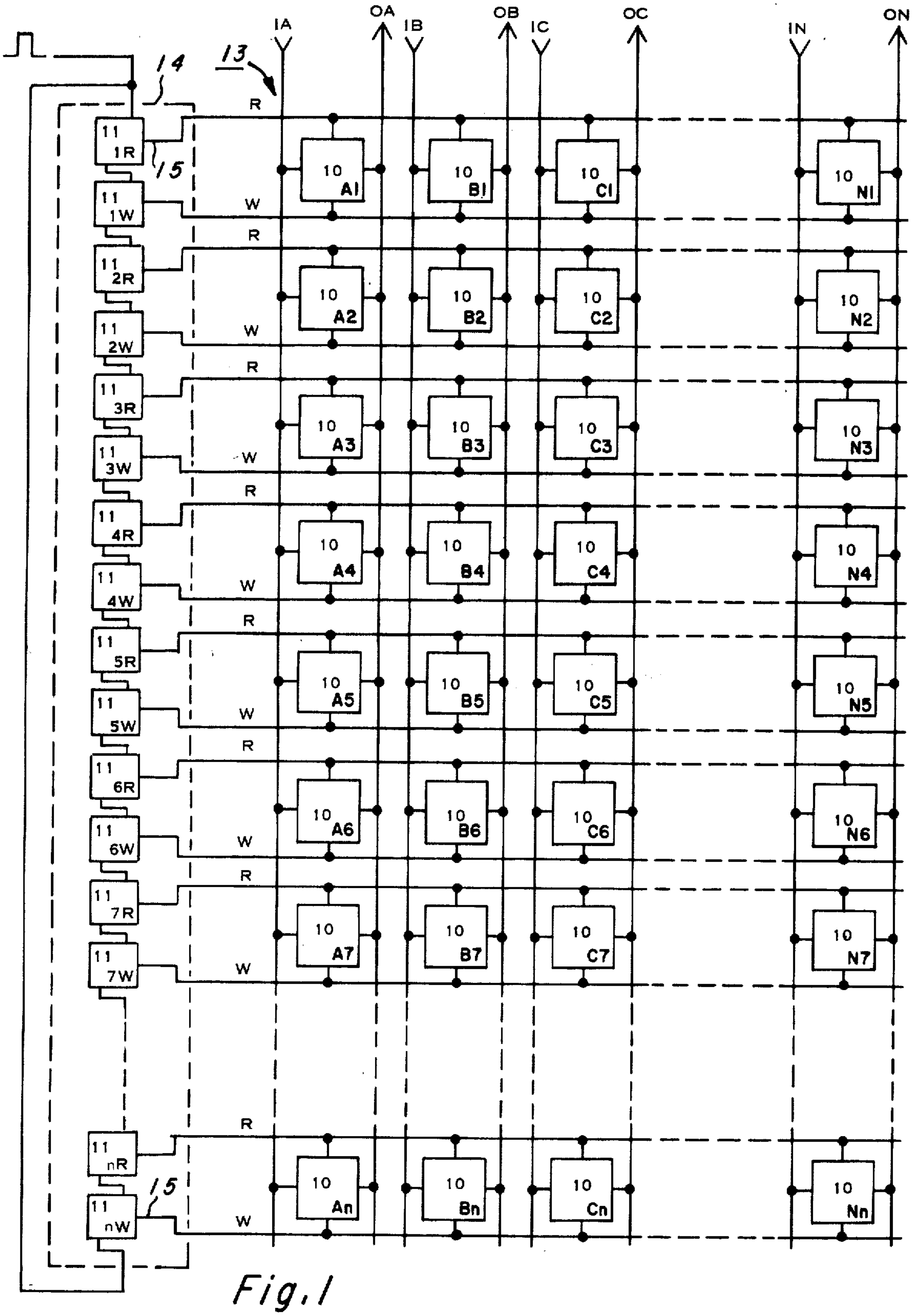
FIGS. 1–8 are block diagrams illustrating various embodiments of the shift register system of the invention.

Referring to FIG. 1, a first embodiment of the shift register system of the invention is shown which stores and shifts N series of bits *n* times. Thus, in this embodiment, a parallel input of a set of N bits is simultaneously introduced into the shift register at selected time periods and a parallel output of a set of N bits is simultaneously provided at the output of the shift register. The present invention shift register embodiment is comprised of random access memory array 13 having *n* rows (1, 2, 3, 4, 5, 6, 7, ..., *n*) and N columns (A, B, C, ...N, where N represents the total number of columns and is not indicative of its numerical position in the alphabet) of random access memory cells. Each memory cell includes an input I, and output O, a write control W, and a read control R. Within each row of cells (1, 2, 3, 4, 5, 6, 7, ..., *n*), the write control means W are commoned and the read control means R are commoned. Thus, for example, cells A1, B1, C1, ... N1 have a common read line and a common write line. Within each column of cells (A, B, C, ... N), the input means I are commoned and the output means O are commoned. Thus, cells A1, A2, A3, A4, A5, A6, A7, ..., A*n* have a common input line IA and a common output line OA.

The read and write lines (labeled R and W, respectively, because they are commoned with the read control means and write control means of the cells in the row) are coupled to a commutator 14. In this first embodiment, the commutator is comprised of a plurality of shift register cells 11 connected in series. Thus, the output of shift register cell 1R is connected to the input of cell 1W, etc. The output of the last cell *n*W is coupled to the input of the first cell 1R. Thus, a pulse introduced into the input of shift register cell 1R is shifted to cell 1W, then from cell 1W to cell 2R, etc., and from cell *n*W to cell 1R so that it is recirculated through the shift register. Signals indicative of the state of each shift register cell is provided on output lines 15 so that at least one of the outputs 15 is indicative of the storage of a pluse in its respective shift register cell.

Various embodiments of random access memory cells 10 and shift register cells 11 will later be described in detail. Consider in general, that when random access memory cells 10 are as stable or more stable than shift register cells, require a much smaller area than shift register cells and require much less power than shift register cells, the end result is a highly stable shift register system which is denser and requires less power than shift registers comprised solely of shift register cells. Where random access memory 13 of the shift register system has *n* rows of cells, *n* to 2*n* shift register cells are utilized in conjunction with memory array 13 to operate the shift register system. The number of columns of cells in the random access memory array is increased to any number without increasing the number of shift register cells required for operation of the system, and hence, the more random access memory cells utilized, the more advantageous the shift register system becomes.

The embodiment of FIG. 1 operates to read information from a cell to an output line and then write new information from the input line into the cell. Thus, when the output of shift register cell 1R is indicative of the pulse being stored in shift register cell 1R information stored in memory cells A1, B1, C1, ... N1 is read out from output lines OA, OB, OC, ... ON, respectively. When the output of shift register cell 1W is indicative of the pulse being stored in shift register cell 1W, information introduced into the memory array at inputs IA, IB, IC ... IN is stored in memory cells A1, B1, C1, ... N1, respectively. Then when the output of shift register cell 2R is indicative of the pulse being stored in shift register cell 2R, information stored in memory cells A2, B2, C2, ... N2 is read out from output lines OA, OB, OC, ... ON, respectively. When the output of shift register cell 2W is indicative of the pulse being stored in shift register cell 2W, information introduced into the memory array at inputs IA, IB, IC, ... IN, is stored in memory cells A2, B2, C2, ... N2, respectively, and so forth. The operation of the shift register system of FIG. 1 over many time periods is shown in in TABLES I A-C. TABLES I A-C show the states of shift register cells 11, the state of memory cells 10, the information introduced at input lines IA, IB, IC, ... IN and the information provided at outputs OA, OB, OC, ... ON for time periods 1 through 6N.

TABLE I A

| | t- | 1 | 2 | 3 | 4 | 5 | 6 | 7 | 8 | 9 | 10 | 11 | 12 | 13 | 14 | . . . 2n−1 | 2n |
|---|---|---|---|---|---|---|---|---|---|---|---|---|---|---|---|---|---|
| 11 | 1R | 1 | | | | | | | | | | | | | | | |
| | 1W | | 1 | | | | | | | | | | | | | | |
| | 2R | | | 1 | | | | | | | | | | | | | |
| | 2W | | | | 1 | | | | | | | | | | | | |
| | 3R | | | | | 1 | | | | | | | | | | | |
| | 3W | | | | | | 1 | | | | | | | | | | |
| | 4R | | | | | | | 1 | | | | | | | | | |
| | 4W | | | | | | | | 1 | | | | | | | | |
| | 5R | | | | | | | | | 1 | | | | | | | |
| | 5W | | | | | | | | | | 1 | | | | | | |
| | 6R | | | | | | | | | | | 1 | | | | | |
| | 6W | | | | | | | | | | | | 1 | | | | |
| | 7R | | | | | | | | | | | | | 1 | | | |
| | 7W | | | | | | | | | | | | | | 1 | | |
| | nR | | | | | | | | | | | | | | | 1 | |
| | nW | | | | | | | | | | | | | | | | 1 |
| 10 | A1 | | a1 | a1 | a1 | a1 | a1 | a1 | a1 | a1 | a1 | a1 | a1 | a1 | a1 | a1 | a1 |
| | A2 | | | | a2 | a2 | a2 | a2 | a2 | a2 | a2 | a2 | a2 | a2 | a2 | a2 | a2 |
| | A3 | | | | | | a3 | a3 | a3 | a3 | a3 | a3 | a3 | a3 | a3 | a3 | a3 |
| | A4 | | | | | | | | a4 | a4 | a4 | a4 | a4 | a4 | a4 | a4 | a4 |
| | A5 | | | | | | | | | | a5 | a5 | a5 | a5 | a5 | a5 | a5 |
| | A6 | | | | | | | | | | | | a6 | a6 | a6 | a6 | a6 |
| | A7 | | | | | | | | | | | | | | a7 | a7 | a7 |
| | An | | | | | | | | | | | | | | | | a8 |
| | B1 | | b1 | b1 | b1 | b1 | b1 | b1 | b1 | b1 | b1 | b1 | b1 | b1 | b1 | b1 | b1 |
| | B2 | | | | b2 | b2 | b2 | b2 | b2 | b2 | b2 | b2 | b2 | b2 | b2 | b2 | b2 |
| | B3 | | | | | | b3 | b3 | b3 | b3 | b3 | b3 | b3 | b3 | b3 | b3 | b3 |
| | B4 | | | | | | | | b4 | b4 | b4 | b4 | b4 | b4 | b4 | b4 | b4 |
| | B5 | | | | | | | | | | b5 | b5 | b5 | b5 | b5 | b5 | b5 |
| | B6 | | | | | | | | | | | | b6 | b6 | b6 | b6 | b6 |
| | B7 | | | | | | | | | | | | | | b7 | b7 | b7 |
| | Bn | | | | | | | | | | | | | | | | b8 |
| | C1 | | c1 | c1 | c1 | c1 | c1 | c1 | c1 | c1 | c1 | c1 | c1 | c1 | c1 | c1 | c1 |
| | C2 | | | | c2 | c2 | c2 | c2 | c2 | c2 | c2 | c2 | c2 | c2 | c2 | c2 | c2 |
| | C3 | | | | | | c3 | c3 | c3 | c3 | c3 | c3 | c3 | c3 | c3 | c3 | c3 |
| | c4 | | | | | | | | c4 | c4 | c4 | c4 | c4 | c4 | c4 | c4 | c4 |
| | C5 | | | | | | | | | | c5 | c5 | c5 | c5 | c5 | c5 | c5 |
| | C6 | | | | | | | | | | | | c6 | c6 | c6 | c6 | c6 |
| | C7 | | | | | | | | | | | | | | c7 | c7 | c7 |
| | Cn | | | | | | | | | | | | | | | | c8 |
| | N1 | | d1 | d1 | d1 | d1 | d1 | d1 | d1 | d1 | d1 | d1 | d1 | d1 | d1 | d1 | d1 |
| | N2 | | | | d2 | d2 | d2 | d2 | d2 | d2 | d2 | d2 | d2 | d2 | d2 | d2 | d2 |
| | N3 | | | | | | d3 | d3 | d3 | d3 | d3 | d3 | d3 | d3 | d3 | d3 | d3 |
| | N4 | | | | | | | | d4 | d4 | d4 | d4 | d4 | d4 | d4 | d4 | d4 |
| | N5 | | | | | | | | | | d5 | d5 | d5 | d5 | d5 | d5 | d5 |
| | N6 | | | | | | | | | | | | d6 | d6 | d6 | d6 | d6 |
| | N7 | | | | | | | | | | | | | | d7 | d7 | d7 |
| | Nn | | | | | | | | | | | | | | | | d8 |
| | IA | | a1 | | a2 | | a3 | | a4 | | a5 | | a6 | | a7 | . . . | a8 |
| | OA | φ | | φ | | φ | | φ | | φ | | φ | | φ | . . . | φ | |
| | IB | | b1 | | b2 | | b3 | | b4 | | b5 | | b6 | | b7 | . . . | b8 |
| | OB | φ | | φ | | φ | | φ | | φ | | φ | | φ | . . . | φ | |

TABLE I A – Continued

| | | | | | | | | | | | | | | | | |
|---|---|---|---|---|---|---|---|---|---|---|---|---|---|---|---|---|
| IC | | c1 | | c2 | | c3 | | c4 | | c5 | | c6 | | c7 | . . . | c8 |
| OC | φ | | φ | | φ | | φ | | φ | | φ | | φ | . . . | φ | |
| IN | | d1 | | d2 | | d3 | | d4 | | d5 | | d6 | | d7 | . . . | d8 |
| ON | φ | | φ | | φ | | φ | | φ | | φ | | φ | . . . | φ | |

TABLE I B

| | t | 2n+1 | 2n+2 | 2n+3 | 2n+4 | 2n+5 | 2n+6 | 2n+7 | 2n+8 | 2n+9 | 2n+10 | 2n+11 | n+12 | 2n+13 | n+14 | . . . 4n−1 | 4n |
|---|---|---|---|---|---|---|---|---|---|---|---|---|---|---|---|---|---|
| 11 | 1R | 1 | | | | | | | | | | | | | | | |
| | 1W | | 1 | | | | | | | | | | | | | | |
| | 2R | | | 1 | | | | | | | | | | | | | |
| | 2W | | | | 1 | | | | | | | | | | | | |
| | 3R | | | | | 1 | | | | | | | | | | | |
| | 3W | | | | | | 1 | | | | | | | | | | |
| | 4R | | | | | | | 1 | | | | | | | | | |
| | 4W | | | | | | | | 1 | | | | | | | | |
| | 5R | | | | | | | | | 1 | | | | | | | |
| | 5W | | | | | | | | | | 1 | | | | | | |
| | 6R | | | | | | | | | | | 1 | | | | | |
| | 6W | | | | | | | | | | | | 1 | | | | |
| | 7R | | | | | | | | | | | | | 1 | | | |
| | 7W | | | | | | | | | | | | | | 1 | | |
| | nR | | | | | | | | | | | | | | | 1 | |
| | nW | | | | | | | | | | | | | | | | 1 |
| 10 | A1 | a1 | a9 | a9 | a9 | a9 | a9 | a9 | a9 | a9 | a9 | a9 | a9 | a9 | a9 | a9 | a9 |
| | A2 | a2 | a2 | a2 | a10 | a10 | a10 | a10 | a10 | a10 | a10 | a10 | a10 | a10 | a10 | a10 | a10 |
| | A3 | a3 | a3 | a3 | a3 | a3 | a11 | a11 | a11 | a11 | a11 | a11 | a11 | a11 | a11 | a11 | a11 |
| | A4 | a4 | a4 | a4 | a4 | a4 | a4 | a4 | a12 | a12 | a12 | a12 | a12 | a12 | a12 | a12 | a12 |
| | A5 | a5 | a5 | a5 | a5 | a5 | a5 | a5 | a5 | a5 | a13 | a13 | a13 | a13 | a13 | a13 | a13 |
| | A6 | a6 | a6 | a6 | a6 | a6 | a6 | a6 | a6 | a6 | a6 | a6 | a14 | a14 | a14 | a14 | a14 |
| | A7 | a7 | a7 | a7 | a7 | a7 | a7 | a7 | a7 | a7 | a7 | a7 | a7 | a7 | a15 | a15 | a15 |
| | An | a8 | a8 | a8 | a8 | a8 | a8 | a8 | a8 | a8 | a8 | a8 | a8 | a8 | a8 | a8 | a16 |
| | B1 | b1 | b9 | b9 | b9 | b9 | b9 | b9 | b9 | b9 | b9 | b9 | b9 | b9 | b9 | b9 | b9 |
| | B2 | b2 | b2 | b2 | b10 | b10 | b10 | b10 | b10 | b10 | b10 | b10 | b10 | b10 | b10 | b10 | b10 |
| | B3 | b3 | b3 | b3 | b3 | b3 | b11 | b11 | b11 | b11 | b11 | b11 | b11 | b11 | b11 | b11 | b11 |
| | B4 | b4 | b4 | b4 | b4 | b4 | b4 | b4 | b12 | b12 | b12 | b12 | b12 | b12 | b12 | b12 | b12 |
| | B5 | b5 | b5 | b5 | b5 | b5 | b5 | b5 | b5 | b5 | b13 | b13 | b13 | b13 | b13 | b13 | b18 |
| | B6 | b6 | b6 | b6 | b6 | b6 | b6 | b6 | b6 | b6 | b6 | b6 | b14 | b14 | b14 | b14 | b14 |
| | B7 | b7 | b7 | b7 | b7 | b7 | b7 | b7 | b7 | b7 | b7 | b7 | b7 | b7 | b15 | b15 | b15 |
| | Bn | b8 | b8 | b8 | b8 | b8 | b8 | b8 | b8 | b8 | b8 | b8 | b8 | b8 | b8 | b8 | b16 |
| | C1 | c1 | c9 | c9 | c9 | c9 | c9 | c9 | c9 | c9 | c9 | c9 | c9 | c9 | c9 | c9 | c9 |
| | C2 | c2 | c2 | c2 | c10 | c10 | c10 | c10 | c10 | c10 | c10 | c10 | c10 | c10 | c10 | c10 | c10 |
| | C3 | c3 | c3 | c3 | c3 | c3 | c11 | c11 | c11 | c11 | c11 | c11 | c11 | c11 | c11 | c11 | c11 |
| | C4 | c4 | c4 | c4 | c4 | c4 | c4 | c4 | c12 | c12 | c12 | c12 | c12 | c12 | c12 | c12 | c12 |
| | C5 | c5 | c5 | c5 | c5 | c5 | c5 | c5 | c5 | c5 | c13 | c13 | c13 | c13 | c13 | c13 | c13 |
| | C6 | c6 | c6 | c6 | c6 | c6 | c6 | c6 | c6 | c6 | c6 | c6 | c14 | c14 | c14 | c14 | c14 |
| | C7 | c7 | c7 | c7 | c7 | c7 | c7 | c7 | c7 | c7 | c7 | c7 | c7 | c7 | c15 | c15 | c15 |
| | Cn | c8 | c8 | c8 | c8 | c8 | c8 | c8 | c8 | c8 | c8 | c8 | c8 | c8 | c8 | c8 | c16 |
| | N1 | d1 | d9 | d9 | d9 | d9 | d9 | d9 | d9 | d9 | d9 | d9 | d9 | d9 | d9 | d9 | d9 |
| | N2 | d2 | d2 | d2 | d10 | d10 | d10 | d10 | d10 | d10 | d10 | d10 | d10 | d10 | d10 | d10 | d10 |
| | N3 | d3 | d3 | d3 | d3 | d3 | d11 | d11 | d11 | d11 | d11 | d11 | d11 | d11 | d11 | d11 | d11 |
| | N4 | d4 | d4 | d4 | d4 | d4 | d4 | d4 | d12 | d12 | d12 | d12 | d12 | d12 | d12 | d12 | d12 |
| | N5 | d5 | d5 | d5 | d5 | d5 | d5 | d5 | d5 | d5 | d13 | d13 | d13 | d13 | d13 | d13 | d13 |
| | N6 | d6 | d6 | d6 | d6 | d6 | d6 | d6 | d6 | d6 | d6 | d6 | d14 | d14 | d14 | d14 | d14 |
| | N7 | d7 | d7 | d7 | d7 | d7 | d7 | d7 | d7 | d7 | d7 | d7 | d7 | d7 | d15 | d15 | d15 |
| | Nn | d8 | d8 | d8 | d8 | d8 | d8 | d8 | d8 | d8 | d8 | d8 | d8 | d8 | d8 | d8 | d16 |
| | IA | | a9 | | a10 | | a11 | | a12 | | a13 | | a14 | | a15 | . . . | a16 |
| | OA | a1 | | a2 | | a3 | | a4 | | a5 | | a6 | | a7 | . . . | a8 | |
| | IB | | b9 | | b10 | | b11 | | b12 | | b13 | | b14 | | b15 | . . . | b16 |
| | OB | b1 | | b2 | | b3 | | b4 | | b5 | | b6 | | b7 | . . . | b8 | |
| | IC | | c9 | | c10 | | c11 | | c12 | | c13 | | c14 | | c15 | . . . | c16 |
| | OC | c1 | | c2 | | c3 | | c4 | | c5 | | c6 | | c7 | . . . | c8 | |
| | IN | | d9 | | d10 | | d11 | | d12 | | d13 | | d14 | | d15 | . . . | d16 |
| | ON | d1 | | d2 | | d3 | | d4 | | d5 | | d6 | | d7 | | d8 | |

TABLE I C

| | t- | 4n+1 | 4n+2 | 4n+3 | 4n+4 | 4n+5 | 4n+6 | 4n+7 | 4n+8 | 4n+9 | 4n+10 | 4n+11 | n+12 | 4n+13 | n+14 | . . . 6n−1 | 6n |
|---|---|---|---|---|---|---|---|---|---|---|---|---|---|---|---|---|---|
| 11 | 1R | 1 | | | | | | | | | | | | | | | |
| | 1W | | 1 | | | | | | | | | | | | | | |
| | 2R | | | 1 | | | | | | | | | | | | | |
| | 2W | | | | 1 | | | | | | | | | | | | |
| | 3R | | | | | 1 | | | | | | | | | | | |
| | 3W | | | | | | 1 | | | | | | | | | | |
| | 4R | | | | | | | 1 | | | | | | | | | |
| | 4W | | | | | | | | 1 | | | | | | | | |
| | 5R | | | | | | | | | 1 | | | | | | | |
| | 5W | | | | | | | | | | 1 | | | | | | |
| | 6R | | | | | | | | | | | 1 | | | | | |
| | 6W | | | | | | | | | | | | 1 | | | | |
| | 7r | | | | | | | | | | | | | 1 | | | |
| | 7W | | | | | | | | | | | | | | 1 | | |
| | nR | | | | | | | | | | | | | | | 1 | |
| | nW | | | | | | | | | | | | | | | | 1 |
| 10 | A1 | a9 | 0 | 0 | 0 | 0 | 0 | 0 | 0 | 0 | 0 | 0 | 0 | 0 | 0 | 0 | 0 |
| | A2 | a10 | a10 | a10 | 0 | 0 | 0 | 0 | 0 | 0 | 0 | 0 | 0 | 0 | 0 | 0 | 0 |
| | A3 | a11 | a11 | a11 | a11 | a11 | 0 | 0 | 0 | 0 | 0 | 0 | 0 | 0 | 0 | 0 | 0 |

TABLE I C – Continued

| | | | | | | | | | | | | | | | | |
|---|---|---|---|---|---|---|---|---|---|---|---|---|---|---|---|---|
| A4 | a12 | a12 | a12 | a12 | a12 | a12 | a12 | 0 | 0 | 0 | 0 | 0 | 0 | 0 | 0 | 0 |
| A5 | a13 | a13 | a13 | a13 | a13 | a13 | a13 | a13 | a13 | 0 | 0 | 0 | 0 | 0 | 0 | 0 |
| A6 | a14 | a14 | a14 | a14 | a14 | a14 | a14 | a14 | a14 | a14 | a14 | 0 | 0 | 0 | 0 | 0 |
| A7 | a15 | a15 | a15 | a15 | a15 | a15 | a15 | a15 | a15 | a15 | a15 | a15 | a15 | 0 | 0 | 0 |
| An | a16 | a16 | a16 | a16 | a16 | a16 | a16 | a16 | a16 | a16 | a16 | a16 | a16 | a16 | a16 | 0 |
| B1 | b9 | 0 | 0 | 0 | 0 | 0 | 0 | 0 | 0 | 0 | 0 | 0 | 0 | 0 | 0 | 0 |
| B2 | b10 | b10 | b10 | 0 | 0 | 0 | 0 | 0 | 0 | 0 | 0 | 0 | 0 | 0 | 0 | 0 |
| B3 | b11 | b11 | b11 | b11 | b11 | 0 | 0 | 0 | 0 | 0 | 0 | 0 | 0 | 0 | 0 | 0 |
| B4 | b12 | b12 | b12 | b12 | b12 | b12 | b12 | 0 | 0 | 0 | 0 | 0 | 0 | 0 | 0 | 0 |
| B5 | b13 | b13 | b13 | b13 | b13 | b13 | b13 | b13 | b13 | 0 | 0 | 0 | 0 | 0 | 0 | 0 |
| B6 | b14 | b14 | b14 | b14 | b14 | b14 | b14 | b14 | b14 | b14 | b14 | 0 | 0 | 0 | 0 | 0 |
| B7 | b15 | b15 | b15 | b15 | b15 | b15 | b15 | b15 | b15 | b15 | b15 | b15 | b15 | 0 | 0 | 0 |
| Bn | b16 | b16 | b16 | b16 | b16 | b16 | b16 | b16 | b16 | b16 | b16 | b16 | b16 | b16 | b16 | 0 |
| C1 | c9 | 0 | 0 | 0 | 0 | 0 | 0 | 0 | 0 | 0 | 0 | 0 | 0 | 0 | 0 | 0 |
| C2 | c10 | c10 | c10 | 0 | 0 | 0 | 0 | 0 | 0 | 0 | 0 | 0 | 0 | 0 | 0 | 0 |
| C3 | c11 | c11 | c11 | c11 | c11 | 0 | 0 | 0 | 0 | 0 | 0 | 0 | 0 | 0 | 0 | 0 |
| C4 | c12 | c12 | c12 | c12 | c12 | c12 | c12 | 0 | 0 | 0 | 0 | 0 | 0 | 0 | 0 | 0 |
| C5 | c13 | c13 | c13 | c13 | c13 | c13 | c13 | c13 | c13 | 0 | 0 | 0 | 0 | 0 | 0 | 0 |
| C6 | c14 | c14 | c14 | c14 | c14 | c14 | c14 | c14 | c14 | c14 | c14 | 0 | 0 | 0 | 0 | 0 |
| C7 | c15 | c15 | c15 | c15 | c15 | c15 | c15 | c15 | c15 | c15 | c15 | c15 | c15 | 0 | 0 | 0 |
| Cn | c16 | c16 | c16 | c16 | c16 | c16 | c16 | c16 | c16 | c16 | c16 | c16 | c16 | c16 | c16 | 0 |
| N1 | d9 | 0 | 0 | 0 | 0 | 0 | 0 | 0 | 0 | 0 | 0 | 0 | 0 | 0 | 0 | 0 |
| N2 | d10 | d10 | d10 | 0 | 0 | 0 | 0 | 0 | 0 | 0 | 0 | 0 | 0 | 0 | 0 | 0 |
| N3 | d11 | d11 | d11 | d11 | d11 | 0 | 0 | 0 | 0 | 0 | 0 | 0 | 0 | 0 | 0 | 0 |
| N4 | d12 | d12 | d12 | d12 | d12 | d12 | d12 | 0 | 0 | 0 | 0 | 0 | 0 | 0 | 0 | 0 |
| N5 | d13 | d13 | d13 | d13 | d13 | d13 | d13 | d13 | d13 | 0 | 0 | 0 | 0 | 0 | 0 | 0 |
| N6 | d14 | d14 | d14 | d14 | d14 | d14 | d14 | d14 | d14 | d14 | d14 | 0 | 0 | 0 | 0 | 0 |
| N7 | d15 | d15 | d15 | d15 | d15 | d15 | d15 | d15 | d15 | d15 | d15 | d15 | d15 | 0 | 0 | 0 |
| Nn | d16 | d16 | d16 | d16 | d16 | d16 | d16 | d16 | d16 | d16 | d16 | d16 | d16 | d16 | d16 | 0 |
| IA | | 0 | | 0 | | 0 | | 0 | | 0 | | 0 | | 0 | . . . | 0 |
| OA | a9 | | a10 | | a11 | | a12 | | a13 | | a14 | | a15 | . . . | a16 | |
| IB | | 0 | | 0 | | 0 | | 0 | | 0 | | 0 | | 0 | . . . | 0 |
| OB | b9 | | b10 | | b11 | | b12 | | b13 | | b14 | | b15 | . . . | b16 | |
| IC | | 0 | | 0 | | 0 | | 0 | | 0 | | 0 | | 0 | . . . | 0 |
| OC | c9 | | c10 | | c11 | | c12 | | c13 | | c14 | | c15 | . . . | c16 | |
| IN | | 0 | | 0 | | 0 | | 0 | | 0 | | 0 | | 0 | . . . | 0 |
| ON | d9 | | d10 | | d11 | | d12 | | d13 | | d14 | | d15 | . . . | d16 | |

In the embodiment of FIG. 1, the pulse first being introduced into shift register cell 1R provides an output from the memory cells of row 1 and then when the pulse is shifted to shift register cell 1W information is introduced into the first row of the memory array, thus providing a one time period delay before information is read into the shift register system. Shift register cells 11 of commutator 14 are rearranged in a second embodiment illustrated in FIG. 2, so that information is written into the system during the first time period. In order to accomplish this, the commutator imput pulse is first applied to shift register cell 1W and lastly to shift register cell 1R before recirculating the pulse the shift register cell 1W. The operation of this second embodiment of the shift register system for time period 1 through 6*n* is shown in TABLES II A–C.

Figure 3:
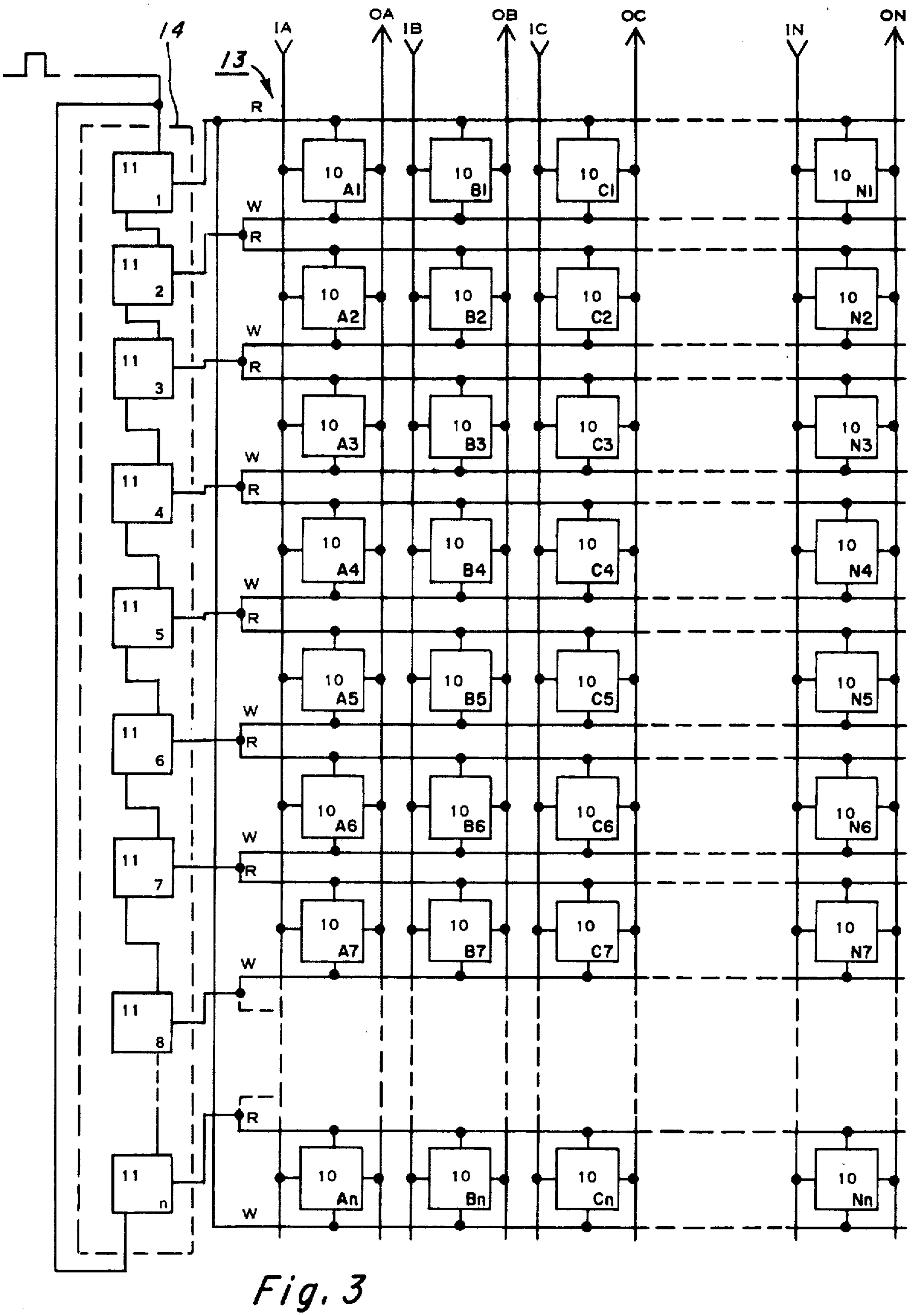

Referring to FIG. 3, a third embodiment of the shift register system of the invention is shown which stores and shifts N series of bits *n* times. Thus, similarly to the first embodiment, a parallel input of a set N bits is simultaneously introduced into the shift register at selected time periods and a parallel output of a set N bits is simultaneously provided at the outputs OA, OB, OC, ..., ON.

In the third embodiment of the shift register system, again, within each row of memory cells 10, the write control means W are commoned and the read control means R are commoned; and, within each column of cells, the input means I are commoned and the output means O are commoned. Furthermore, in this third embodiment, the write control means W of the *n* th row is commoned to the read control means R of the 1st row and the write control means W of intermediate rows are commoned to the write control means W of the next adjacent rows as illustrated in FIG. 3.

TABLE II A

| | t- | 1 | 2 | 3 | 4 | 5 | 6 | 7 | 8 | 9 | 10 | 11 | 12 | 13 | 14 | . . . 2n−1 | 2n |
|---|---|---|---|---|---|---|---|---|---|---|---|---|---|---|---|---|---|
| 11 | 1W | 1 | | | | | | | | | | | | | | | |
| | 2R | | 1 | | | | | | | | | | | | | | |
| | 2W | | | 1 | | | | | | | | | | | | | |
| | 3R | | | | 1 | | | | | | | | | | | | |
| | 3W | | | | | 1 | | | | | | | | | | | |
| | 4R | | | | | | 1 | | | | | | | | | | |
| | 4W | | | | | | | 1 | | | | | | | | | |
| | 5R | | | | | | | | 1 | | | | | | | | |
| | 5w | | | | | | | | | 1 | | | | | | | |
| | 6R | | | | | | | | | | 1 | | | | | | |
| | 6W | | | | | | | | | | | 1 | | | | | |
| | 7R | | | | | | | | | | | | 1 | | | | |
| | 7W | | | | | | | | | | | | | 1 | | | |
| | nR | | | | | | | | | | | | | | 1 | | |
| | nW | | | | | | | | | | | | | | | 1 | |
| | 1R | | | | | | | | | | | | | | | | 1 |
| 10 | A1 | a1 | a1 | a1 | a1 | a1 | a1 | a1 | a1 | a1 | a1 | a1 | a1 | a1 | a1 | a1 | a1 |
| | A2 | | | a2 | a2 | a2 | a2 | a2 | a2 | a2 | a2 | a2 | a2 | a2 | a2 | a2 | a2 |
| | A3 | | | | | a3 | a3 | a3 | a3 | a3 | a3 | a3 | a3 | a3 | a3 | a3 | a3 |
| | A4 | | | | | | | a4 | a4 | a4 | a4 | a4 | a4 | a4 | a4 | a4 | a4 |
| | A5 | | | | | | | | | a5 | a5 | a5 | a5 | a5 | a5 | a5 | a5 |
| | A6 | | | | | | | | | | | a6 | a6 | a6 | a6 | a6 | a6 |
| | A7 | | | | | | | | | | | | | a7 | a7 | a7 | a7 |
| | An | | | | | | | | | | | | | | | a8 | a8 |

TABLE II A – Continued

| | | | | | | | | | | | | | | | | |
|---|---|---|---|---|---|---|---|---|---|---|---|---|---|---|---|---|
| B1 | b1 | b1 | b1 | b1 | b1 | b1 | b1 | b1 | b1 | b1 | b1 | b1 | b1 | b1 | b1 | b1 |
| B2 | | | b2 | b2 | b2 | b2 | b2 | b2 | b2 | b2 | b2 | b2 | b2 | b2 | b2 | b2 |
| B3 | | | | | b3 | b3 | b3 | b3 | b3 | b3 | b3 | b3 | b3 | b3 | b3 | b3 |
| B4 | | | | | | | b4 | b4 | b4 | b4 | b4 | b4 | b4 | b4 | b4 | b4 |
| B5 | | | | | | | | | b5 | b5 | b5 | b5 | b5 | b5 | b5 | b5 |
| B6 | | | | | | | | | | | b6 | b6 | b6 | b6 | b6 | b6 |
| B7 | | | | | | | | | | | | | b7 | b7 | b7 | b7 |
| Bn | | | | | | | | | | | | | | | b8 | b8 |
| C1 | c1 | c1 | c1 | c1 | c1 | c1 | c1 | c1 | c1 | c1 | c1 | c1 | c1 | c1 | c1 | c1 |
| C2 | | | c2 | c2 | c2 | c2 | c2 | c2 | c2 | c2 | c2 | c2 | c2 | c2 | c2 | c2 |
| C3 | | | | | c3 | c3 | c3 | c3 | c3 | c3 | c3 | c3 | c3 | c3 | c3 | c3 |
| C4 | | | | | | | c4 | c4 | c4 | c4 | c4 | c4 | c4 | c4 | c4 | c4 |
| C5 | | | | | | | | | c5 | c5 | c5 | c5 | c5 | c5 | c5 | c5 |
| C6 | | | | | | | | | | | c6 | c6 | c6 | c6 | c6 | c6 |
| C7 | | | | | | | | | | | | | c7 | c7 | c7 | c7 |
| Cn | | | | | | | | | | | | | | | c8 | c8 |
| N1 | d1 | d1 | d1 | d1 | d1 | d1 | d1 | d1 | d1 | d1 | d1 | d1 | d1 | d1 | d1 | d1 |
| N2 | | | d2 | d2 | d2 | d2 | d2 | d2 | d2 | d2 | d2 | d2 | d2 | d2 | d2 | d2 |
| N3 | | | | | d3 | d3 | d3 | d3 | d3 | d3 | d3 | d3 | d3 | d3 | d3 | d3 |
| N4 | | | | | | | d4 | d4 | d4 | d4 | d4 | d4 | d4 | d4 | d4 | d4 |
| N5 | | | | | | | | | d5 | d5 | d5 | d5 | d5 | d5 | d5 | d5 |
| N6 | | | | | | | | | | | d6 | d6 | d6 | d6 | d6 | d6 |
| N7 | | | | | | | | | | | | | d7 | d7 | d7 | d7 |
| Nn | | | | | | | | | | | | | | | d8 | d8 |
| IA | a1 | | a2 | | a3 | | a4 | | a5 | | a6 | | a7 | . . . | a8 | |
| OA | | φ | | φ | | φ | | φ | | φ | | φ | | φ | . . . | a1φ |
| IB | b1 | | b2 | | b3 | | b4 | | b5 | | b6 | | b7 | . . . | b8 | |
| OB | | φ | | φ | | φ | | φ | | φ | | φ | | φ | . . . | b1φ |
| IC | c1 | | c2 | | c3 | | c4 | | c5 | | c6 | | c7 | . . . | c8 | c1 |
| OC | | φ | | φ | | φ | | φ | | φ | | φ | | φ | . . . | φ |
| IN | d1 | | d2 | | d3 | | d4 | | d5 | | d6 | | d7 | . . . | d8 | |
| ON | | φ | | φ | | φ | | φ | | φ | | φ | | φ | . . . | d1φ |

TABLE II B

| | t- | 2n+1 | 2n+2 | 2n+3 | 2n+4 | 2n+5 | 2n+6 | 2n+7 | 2n+8 | 2n+9 | 2n+10 | 2n+11 | n+12 | 2n+13 | 2n+14 . . . | 4n−1 | 4n |
|---|---|---|---|---|---|---|---|---|---|---|---|---|---|---|---|---|---|
| 11 | 1W | 1 | | | | | | | | | | | | | | | |
| | 2R | | 1 | | | | | | | | | | | | | | |
| | 2W | | | 1 | | | | | | | | | | | | | |
| | 3R | | | | 1 | | | | | | | | | | | | |
| | 3W | | | | | 1 | | | | | | | | | | | |
| | 4R | | | | | | 1 | | | | | | | | | | |
| | 4W | | | | | | | 1 | | | | | | | | | |
| | 5R | | | | | | | | 1 | | | | | | | | |
| | 5W | | | | | | | | | 1 | | | | | | | |
| | 6R | | | | | | | | | | 1 | | | | | | |
| | 6W | | | | | | | | | | | 1 | | | | | |
| | 7R | | | | | | | | | | | | 1 | | | | |
| | 7W | | | | | | | | | | | | | 1 | | | |
| | nR | | | | | | | | | | | | | | 1 | | |
| | nW | | | | | | | | | | | | | | | 1 | |
| | 1R | | | | | | | | | | | | | | | | 1 |
| 10 | A1 | a9 | a9 | a9 | a9 | a9 | a9 | a9 | a9 | a9 | a9 | a9 | a9 | a9 | a9 | a9 | a9 |
| | A2 | a2 | a2 | a10 | a10 | a10 | a10 | a10 | a10 | a10 | a10 | a10 | a10 | a10 | a10 | a10 | a10 |
| | A3 | a3 | a3 | a3 | a3 | a11 | a11 | a11 | a11 | a11 | a11 | a11 | a11 | a11 | a11 | a11 | a11 |
| | A4 | a4 | a4 | a4 | a4 | a4 | a4 | a12 | a12 | a12 | a12 | a12 | a12 | a12 | a12 | a12 | a12 |
| | A5 | a5 | a5 | a5 | a5 | a5 | a5 | a5 | a5 | a13 | a13 | a13 | a13 | a13 | a13 | a13 | a13 |
| | A6 | a6 | a6 | a6 | a6 | a6 | a6 | a6 | a6 | a6 | a6 | a14 | a14 | a14 | a14 | a14 | a14 |
| | A7 | a7 | a7 | a7 | a7 | a7 | a7 | a7 | a7 | a7 | a7 | a7 | a7 | a15 | a15 | a15 | a15 |
| | An | a8 | a8 | a8 | a8 | a8 | a8 | a8 | a8 | a8 | a8 | a8 | a8 | a8 | a8 | a16 | a16 |
| | B1 | b9 | b9 | b9 | b9 | b9 | b9 | b9 | b9 | b9 | b9 | b9 | b9 | b9 | b9 | b9 | b9 |
| | B2 | b2 | b2 | b10 | b10 | b10 | b10 | b10 | b10 | b10 | b10 | b10 | b10 | b10 | b10 | b10 | b10 |
| | B3 | b3 | b3 | b3 | b3 | b11 | b11 | b11 | b11 | b11 | b11 | b11 | b11 | b11 | b11 | b11 | b11 |
| | B4 | b4 | b4 | b4 | b4 | b4 | b4 | b12 | b12 | b12 | b12 | b12 | b12 | b12 | b12 | b12 | b12 |
| | B5 | b5 | b5 | b5 | b5 | b5 | b5 | b5 | b5 | b13 | b13 | b13 | b13 | b13 | b13 | b13 | b13 |
| | B6 | b6 | b6 | b6 | b6 | b6 | b6 | b6 | b6 | b6 | b6 | b14 | b14 | b14 | b14 | b14 | b14 |
| | B7 | b7 | b7 | b7 | b7 | b7 | b7 | b7 | b7 | b7 | b7 | b7 | b7 | b15 | b15 | b15 | b15 |
| | Bn | b8 | b8 | b8 | b8 | b8 | b8 | b8 | b8 | b8 | b8 | b8 | b8 | b8 | b8 | b16 | b16 |
| | C1 | c9 | c9 | c9 | c9 | c9 | c9 | c9 | c9 | c9 | c9 | c9 | c9 | c9 | c9 | c9 | c9 |
| | C2 | c2 | c2 | c10 | c10 | c10 | c10 | c10 | c10 | c10 | c10 | c10 | c10 | c10 | c10 | c10 | c10 |
| | C3 | c3 | c3 | c3 | c3 | c11 | c11 | c11 | c11 | c11 | c11 | c11 | c11 | c11 | c11 | c11 | c11 |
| | C4 | c4 | c4 | c4 | c4 | c4 | c4 | c12 | c12 | c12 | c12 | c12 | c12 | c12 | c12 | c12 | c12 |
| | C5 | c5 | c5 | c5 | c5 | c5 | c5 | c5 | c5 | c13 | c13 | c13 | c13 | c13 | c13 | c13 | c13 |
| | C6 | c6 | c6 | c6 | c6 | c6 | c6 | c6 | c6 | c6 | c6 | c14 | c14 | c14 | c14 | c14 | c14 |
| | C7 | c7 | c7 | c7 | c7 | c7 | c7 | c7 | c7 | c7 | c7 | c7 | c7 | c15 | c15 | c15 | c15 |
| | Cn | c8 | c8 | c8 | c8 | c8 | c8 | c8 | c8 | c8 | c8 | c8 | c8 | c8 | c8 | c16 | c16 |
| | N1 | d9 | d9 | d9 | d9 | d9 | d9 | d9 | d9 | d9 | d9 | d9 | d9 | d9 | d9 | d9 | d9 |
| | N2 | d2 | d2 | d10 | d10 | d10 | d10 | d10 | d10 | d10 | d10 | d10 | d10 | d10 | d10 | d10 | d10 |
| | N3 | d3 | d3 | d3 | d3 | d11 | d11 | d11 | d11 | d11 | d11 | d11 | d11 | d11 | d11 | d11 | d11 |
| | N4 | d4 | d4 | d4 | d4 | d4 | d4 | d12 | d12 | d12 | d12 | d12 | d12 | d12 | d12 | d12 | d12 |
| | N5 | d5 | d5 | d5 | d5 | d5 | d5 | d5 | d5 | d13 | d13 | d13 | d13 | d13 | d13 | d13 | d13 |
| | N6 | d6 | d6 | d6 | d6 | d6 | d6 | d6 | d6 | d6 | d6 | d14 | d14 | d14 | d14 | d14 | d14 |
| | N7 | d7 | d7 | d7 | d7 | d7 | d7 | d7 | d7 | d7 | d7 | d7 | d7 | d15 | d15 | d15 | d15 |
| | Nn | d8 | d8 | d8 | d8 | d8 | d8 | d8 | d8 | d8 | d8 | d8 | d8 | d8 | d8 | d16 | d16 |
| | IA | a9 | | a10 | | a11 | | a12 | | a13 | | a14 | | a15 | . . . | a16 | |
| | OA | | a2 | | a3 | | a4 | | a5 | | a6 | | a7 | | a8 | . . . | a9 |
| | IB | 69 | | b10 | | b11 | | b12 | | b13 | | b14 | | b15 | . . . | b16 | |
| | OB | | b2 | | b3 | | b4 | | b5 | | b6 | | b7 | | b8 | . . . | b9 |
| | IC | c9 | | c10 | | c11 | | c12 | | c13 | | c14 | | c15 | . . . | c16 | |
| | OC | | c2 | | c3 | | c4 | | c5 | | c6 | | c7 | | c8 | . . . | c9 |
| | IN | d9 | | d10 | | d11 | | d12 | | d13 | | d14 | | d15 | . . . | d16 | |
| | ON | | d2 | | d3 | | d4 | | d5 | | d6 | | d7 | | d8 | . . . | d9 |

TABLE II C

| | t- | 4n+1 | 4n+2 | 4n+3 | 4n+4 | 4n+5 | 4n+6 | 4n+7 | 4n+8 | 4n+9 | 4n+10 | 4n+11 | 4n+12 | 4n+1 | 4n+14 | . . . 6n+1 | 6n |
|---|---|---|---|---|---|---|---|---|---|---|---|---|---|---|---|---|---|
| 11 | 1W | 1 | | | | | | | | | | | | | | | |
| | 2R | | 1 | | | | | | | | | | | | | | |
| | 2W | | | 1 | | | | | | | | | | | | | |
| | 3R | | | | 1 | | | | | | | | | | | | |
| | 3W | | | | | 1 | | | | | | | | | | | |
| | 4R | | | | | | 1 | | | | | | | | | | |
| | 4W | | | | | | | 1 | | | | | | | | | |
| | 5R | | | | | | | | 1 | | | | | | | | |
| | 5W | | | | | | | | | 1 | | | | | | | |
| | 6R | | | | | | | | | | 1 | | | | | | |
| | 6W | | | | | | | | | | | 1 | | | | | |
| | 7R | | | | | | | | | | | | 1 | | | | |
| | 7W | | | | | | | | | | | | | 1 | | | |
| | nR | | | | | | | | | | | | | | 1 | | |
| | nW | | | | | | | | | | | | | | | 1 | |
| | 1R | | | | | | | | | | | | | | | | 1 |
| 10 | A1 | 0 | 0 | 0 | 0 | 0 | 0 | 0 | 0 | 0 | 0 | 0 | 0 | 0 | 0 | 0 | 0 |
| | A2 | a10 | a10 | 0 | 0 | 0 | 0 | 0 | 0 | 0 | 0 | 0 | 0 | 0 | 0 | 0 | 0 |
| | A3 | a11 | a11 | a11 | a11 | 0 | 0 | 0 | 0 | 0 | 0 | 0 | 0 | 0 | 0 | 0 | 0 |
| | A4 | a12 | a12 | a12 | a12 | a12 | a12 | 0 | 0 | 0 | 0 | 0 | 0 | 0 | 0 | 0 | 0 |
| | A5 | a13 | a13 | a13 | a13 | a13 | a13 | a13 | a13 | 0 | 0 | 0 | 0 | 0 | 0 | 0 | 0 |
| | A6 | a14 | a14 | a14 | a14 | a14 | a14 | a14 | a14 | a14 | a14 | 0 | 0 | 0 | 0 | 0 | 0 |
| | A7 | a15 | a15 | a15 | a15 | a15 | a15 | a15 | a15 | a15 | a15 | a15 | a15 | 0 | 0 | 0 | 0 |
| | An | a16 | a16 | a16 | a16 | a16 | a16 | a16 | a16 | a16 | a16 | a16 | a16 | a16 | a16 | 0 | 0 |
| | B1 | 0 | 0 | 0 | 0 | 0 | 0 | 0 | 0 | 0 | 0 | 0 | 0 | 0 | 0 | 0 | 0 |
| | B2 | b10 | b10 | 0 | 0 | 0 | 0 | 0 | 0 | 0 | 0 | 0 | 0 | 0 | 0 | 0 | 0 |
| | B3 | b11 | b11 | b11 | b11 | 0 | 0 | 0 | 0 | 0 | 0 | 0 | 0 | 0 | 0 | 0 | 0 |
| | B4 | b12 | b12 | b12 | b12 | b12 | b12 | 0 | 0 | 0 | 0 | 0 | 0 | 0 | 0 | 0 | 0 |
| | B5 | b13 | b13 | b13 | b13 | b13 | b13 | b13 | b13 | 0 | 0 | 0 | 0 | 0 | 0 | 0 | 0 |
| | B6 | b14 | b14 | b14 | b14 | b14 | b14 | b14 | b14 | b14 | b14 | 0 | 0 | 0 | 0 | 0 | 0 |
| | B7 | b15 | b15 | b15 | b15 | b15 | b15 | b15 | b15 | b15 | b15 | b15 | b15 | 0 | 0 | 0 | 0 |
| | Bn | b16 | b16 | b16 | b16 | b16 | b16 | b16 | b16 | b16 | b16 | b16 | b16 | b16 | b16 | 0 | 0 |
| | C1 | 0 | 0 | 0 | 0 | 0 | 0 | 0 | 0 | 0 | 0 | 0 | 0 | 0 | 0 | 0 | 0 |
| | C2 | c10 | c10 | 0 | 0 | 0 | 0 | 0 | 0 | 0 | 0 | 0 | 0 | 0 | 0 | 0 | 0 |
| | C3 | c11 | c11 | c11 | c11 | 0 | 0 | 0 | 0 | 0 | 0 | 0 | 0 | 0 | 0 | 0 | 0 |
| | C4 | c12 | c12 | c12 | c12 | c12 | c12 | 0 | 0 | 0 | 0 | 0 | 0 | 0 | 0 | 0 | 0 |
| | C5 | c13 | c13 | c13 | c13 | c13 | c13 | c13 | c13 | 0 | 0 | 0 | 0 | 0 | 0 | 0 | 0 |
| | C6 | c14 | c14 | c14 | c14 | c14 | c14 | c14 | c14 | c14 | c14 | 0 | 0 | 0 | 0 | 0 | 0 |
| | C7 | c15 | c15 | c15 | c15 | c15 | c15 | c15 | c15 | c15 | c15 | c15 | c15 | 0 | 0 | 0 | 0 |
| | Cn | c16 | c16 | c16 | c16 | c16 | c16 | c16 | c16 | c16 | c16 | c16 | c16 | c16 | c16 | 0 | 0 |
| | N1 | 0 | 0 | 0 | 0 | 0 | 0 | 0 | 0 | 0 | 0 | 0 | 0 | 0 | 0 | 0 | 0 |
| | N2 | d10 | d10 | 0 | 0 | 0 | 0 | 0 | 0 | 0 | 0 | 0 | 0 | 0 | 0 | 0 | 0 |
| | N3 | d11 | d11 | d11 | d11 | 0 | 0 | 0 | 0 | 0 | 0 | 0 | 0 | 0 | 0 | 0 | 0 |
| | N4 | d12 | d12 | d12 | d12 | d12 | d12 | 0 | 0 | 0 | 0 | 0 | 0 | 0 | 0 | 0 | 0 |
| | N5 | d13 | d13 | d13 | d13 | d13 | d13 | d13 | d13 | 0 | 0 | 0 | 0 | 0 | 0 | 0 | 0 |
| | N6 | d14 | d14 | d14 | d14 | d14 | d14 | d14 | d14 | d14 | d14 | 0 | 0 | 0 | 0 | 0 | 0 |
| | N7 | d15 | d15 | d15 | d15 | d15 | d15 | d15 | d15 | d15 | d15 | d15 | d15 | 0 | 0 | 0 | 0 |
| | Nn | d16 | d16 | d16 | d16 | d16 | d16 | d16 | d16 | d16 | d16 | d16 | d16 | d16 | d16 | 0 | 0 |
| | IA | 0 | | 0 | | 0 | | 0 | | 0 | | 0 | | 0 | . . . | 0 | |
| | OA | | a10 | | a11 | | a12 | | a13 | | a14 | | a15 | | a16 | . . . | a0 |
| | IB | 0 | | 0 | | 0 | | 0 | | 0 | | 0 | | 0 | . . . | 0 | |
| | OB | | b10 | | b11 | | b12 | | b13 | | b14 | | b15 | | b16 | . . . | b0 |
| | IC | 0 | | 0 | | 0 | | 0 | | 0 | | 0 | | 0 | . . . | 0 | |
| | OC | | c10 | | c11 | | c12 | | c13 | | c14 | | c15 | | c16 | . . . | c0 |
| | IN | 0 | | 0 | | 0 | | 0 | | 0 | | 0 | | 0 | . . . | 0 | |
| | ON | | d10 | | d11 | | d12 | | d13 | | d14 | | d15 | | d16 | . . . | d0 |

Thus, the write control line for row 1 is commoned with the read control line of row 2, the write control line of row 2 is commoned with read control line of row 3, etc., and the write control line of the *n*-1th row (not shown) is commoned to the read control line of the *n* th row. For purposes of illustrating the commoning of the write and read control lines of adjacent rows of memory cells the individual write and read lines of adjacent rows are shown connected together. In a preferred embodiment, however, only a single common write/read line is provided in order to further reduce the size or increase the density of the shift register system. It should be noted that in this embodiment, because the read control means and the write control means of adjacent rows of cells are commoned only *n* shift register cells 11 are required to comprise the commutator system 14. Thus, in the first time period information is written from inputs IA, IB, IC, ..., IN into memory cells A*n*, B*n*, C*n*, ..., N*n*, respectively while simultaneously information stored in memory cells A1, B1, C1, ..., N1 is read out and provided at outputs OA, OB, OC, ..., ON, respectively. In the second time period new information is written into memory cells A1, B1, C1, ..., N1 while simultaneously information is read out of memory cells A2, B2, C2, ..., N2 and provided at outputs OA, OB, OC, ..., ON, respectively. As long as information is read out of a row before new information is written into the row all information is preserved. The operation of the shift register system of FIG. 3 over many time periods is shown in TABLE III A and B. TABLES III A and B show the states of shift register cells 11, the state of memory cells 10, the information introduced into input lines IA, IB, IC, ...., IN and the information provided at outputs OA, OB, OC, ..., ON for time periods 1 through 3*n*.

TABLE III A

| | t- | 1 | 2 | 3 | 4 | 5 | 6 | 7 | 8 | . . . | n | n+1 | n+2 | n+3 | n+4 | n+5 | n+6 |
|---|---|---|---|---|---|---|---|---|---|---|---|---|---|---|---|---|---|
| 11 | 1 | 1 | | | | | | | | | | 1 | | | | | |
| | 2 | | 1 | | | | | | | | | | 1 | | | | |
| | 3 | | | 1 | | | | | | | | | | 1 | | | |
| | 4 | | | | 1 | | | | | | | | | | 1 | | |

TABLE III A–Continued

| | | | | | | | | | | | | | | | |
|---|---|---|---|---|---|---|---|---|---|---|---|---|---|---|---|
| 5 | | | | | 1 | | | | | | | | | 1 | |
| 6 | | | | | | 1 | | | | | | | | | 1 |
| 7 | | | | | | | 1 | . . . | | | | | | | |
| n | | | | | | | | | 1 | | | | | | |
| A1 | | a1 | a1 | a1 | a1 | a1 | a1 | a1 | a1 | a1 | a9 | a9 | a9 | a9 | a9 |
| A2 | | | a2 | a2 | a2 | a2 | a2 | a2 | a2 | a2 | a2 | a10 | a10 | a10 | a10 |
| A3 | | | | a3 | a3 | a3 | a3 | a3 | a3 | a3 | a3 | a3 | a11 | a11 | a11 |
| A4 | | | | | a4 | a4 | a4 | a4 | a4 | a4 | a4 | a4 | a4 | a12 | a12 |
| A5 | | | | | | a5 | a5 | a5 | a5 | a5 | a5 | a5 | a5 | a5 | a13 |
| A6 | | | | | | | a6 | a6 | a6 | a6 | a6 | a6 | a6 | a6 | a6 |
| A7 | | | | | | | | a7 | a7 | a7 | a7 | a7 | a7 | a7 | a7 |
| An | | | | | | | | | . . . | a8 | a8 | a8 | a8 | a8 | a8 |
| B1 | | b1 | b1 | b1 | b1 | b1 | b1 | b1 | b1 | b1 | b9 | b9 | b9 | 69 | b9 |
| B2 | | | b2 | b2 | b2 | b2 | b2 | b2 | b2 | b2 | b2 | b10 | b10 | b10 | b10 |
| B3 | | | | b3 | b3 | b3 | b3 | b3 | b3 | b3 | b3 | b3 | b11 | b11 | b11 |
| B4 | | | | | b4 | b4 | b4 | b4 | b4 | b4 | b4 | b4 | b4 | b12 | b12 |
| B5 | | | | | | b5 | b5 | b5 | b5 | b5 | b5 | b5 | b5 | b5 | b13 |
| B6 | | | | | | | b6 | b6 | b6 | b6 | b6 | b6 | b6 | b6 | b6 |
| B7 | | | | | | | | b7 | b7 | b7 | b7 | b7 | b7 | b7 | b7 |
| Bn | | | | | | | | | . . . | b8 | b8 | b8 | b8 | b8 | b8 |
| C1 | | c1 | c1 | c1 | c1 | c1 | c1 | c1 | c1 | c1 | c9 | c9 | c9 | c9 | c9 |
| C2 | | | c2 | c2 | c2 | c2 | c2 | c2 | c2 | c2 | c2 | c10 | c10 | c10 | c10 |
| C3 | | | | c3 | c3 | c3 | c3 | c3 | c3 | c3 | c3 | c3 | c11 | c11 | c11 |
| C4 | | | | | c4 | c4 | c4 | c4 | c4 | c4 | c4 | c4 | c4 | c12 | c12 |
| C5 | | | | | | c5 | c5 | c5 | c5 | c5 | c5 | c5 | c5 | c5 | c13 |
| C6 | | | | | | | c6 | c6 | c6 | c6 | c6 | c6 | c6 | c6 | c6 |
| C7 | | | | | | | | c7 | c7 | c7 | c7 | c7 | c7 | c7 | c7 |
| Cn | | | | | | | | | . . . | c8 | c8 | c8 | c8 | c8 | c8 |
| N1 | | d1 | d1 | d1 | d1 | d1 | d1 | d1 | d1 | d1 | d9 | d9 | d9 | d9 | d9 |
| N2 | | | d2 | d2 | d2 | d2 | d2 | d2 | d2 | d2 | d2 | d10 | d10 | d10 | d10 |
| N3 | | | | d3 | d3 | d3 | d3 | d3 | d3 | d3 | d3 | d3 | d11 | d11 | d11 |
| N4 | | | | | d4 | d4 | d4 | d4 | d4 | d4 | d4 | d4 | d4 | d12 | d12 |
| N5 | | | | | | d5 | d5 | d5 | d5 | d5 | d5 | d5 | d5 | d5 | d13 |
| N6 | | | | | | | d6 | d6 | d6 | d6 | d6 | d6 | d6 | d6 | d6 |
| N7 | | | | | | | | d7 | d7 | d7 | d7 | d7 | d7 | d7 | d7 |
| Nn | | | | | | | | | . . . | d8 | d8 | d8 | d8 | d8 | d8 |
| IA | | a1 | a2 | a3 | a4 | a5 | a6 | a7 | . . . | a8 | a9 | a10 | a11 | a12 | a13 |
| OA | ϕ | ϕ | ϕ | ϕ | ϕ | ϕ | ϕ | . . . | ϕ | a1 | a2 | a3 | a4 | a5 | a6 |
| IB | | b1 | b2 | b3 | b4 | b5 | b6 | b7 | . . . | b8 | b9 | b10 | b11 | b12 | b13 |
| OB | ϕ | ϕ | ϕ | ϕ | ϕ | ϕ | ϕ | . . . | ϕ | b1 | b2 | b3 | b4 | b5 | b6 |
| IC | | c1 | c2 | c3 | c4 | c5 | c6 | c7 | . . . | c8 | c9 | c10 | c11 | c12 | c13 |
| OC | ϕ | ϕ | ϕ | ϕ | ϕ | ϕ | ϕ | . . . | ϕ | c1 | c2 | c3 | c4 | c5 | c6 |
| IN | | d1 | d2 | d3 | d4 | d5 | d6 | d7 | . . . | d8 | d9 | d10 | d11 | d12 | d13 |
| ON | ϕ | ϕ | ϕ | ϕ | ϕ | ϕ | ϕ | . . . | ϕ | d1 | d2 | d3 | d4 | d5 | d6 |

TABLE III B

| t- | n+7 | n+8 | . . . 2n | 2n+1 | 2n+2 | 2n+3 | 2n+4 | 2n+5 | 2n+6 | 2n+7 | 2n+8 | . . . 3n |
|---|---|---|---|---|---|---|---|---|---|---|---|---|
| 1 | | | | 1 | | | | | | | | |
| 2 | | | | | f | | | | | | | |
| 3 | | | | | | 1 | | | | | | |
| 4 | | | | | | | 1 | | | | | |
| 5 | | | | | | | | 1 | | | | |
| 6 | | | | | | | | | 1 | | | |
| 7 | 1 | . . . | | | | | | | | 1 | . . . | |
| n | | | 1 | | | | | | | | | 1 |
| A1 | a9 | a9 | a9 | a9 | 0 | 0 | 0 | 0 | 0 | 0 | 0 | 0 |
| A2 | a10 | a10 | a10 | a10 | a10 | 0 | 0 | 0 | 0 | 0 | 0 | 0 |
| A3 | a11 | a11 | a11 | a11 | a11 | a11 | 0 | 0 | 0 | 0 | 0 | 0 |
| A4 | a12 | a12 | a12 | a12 | a12 | a12 | a12 | 0 | 0 | 0 | 0 | 0 |
| A5 | a13 | a13 | a13 | a13 | a13 | a13 | a13 | a13 | 0 | 0 | 0 | 0 |
| A6 | a14 | a14 | a14 | a14 | a14 | a14 | a14 | a14 | a14 | 0 | 0 | 0 |
| A7 | a7 | a15 | a15 | a15 | a15 | a15 | a15 | a15 | a15 | a15 | 0 | 0 |
| An | a8 | a8 | | a16 | a16 | a16 | a16 | a16 | a16 | a16 | a16 | . . . |
| B1 | b9 | b9 | b9 | b9 | 0 | 0 | 0 | 0 | 0 | 0 | 0 | 0 |
| B2 | b10 | b10 | b10 | b10 | b10 | 0 | 0 | 0 | 0 | 0 | 0 | 0 |
| B3 | b11 | b11 | b11 | b11 | b11 | b11 | 0 | 0 | 0 | 0 | 0 | 0 |
| B4 | b12 | b12 | b12 | b12 | b12 | b12 | b12 | 0 | 0 | 0 | 0 | 0 |
| B5 | b13 | b13 | b13 | b13 | b13 | b13 | b13 | b13 | 0 | 0 | 0 | 0 |
| B6 | b14 | b14 | b14 | b14 | b14 | b14 | b14 | b14 | b14 | 0 | 0 | 0 |
| B7 | b7 | b15 | b15 | b15 | b15 | b15 | b15 | b15 | b15 | b15 | 0 | 0 |
| Bn | b8 | b8 | | b16 | b16 | b16 | b16 | b16 | b16 | b16 | b16 | . . . |
| C1 | c9 | c9 | c9 | c9 | 0 | 0 | 0 | 0 | 0 | 0 | 0 | 0 |
| C2 | c10 | c10 | c10 | c10 | c10 | 0 | 0 | 0 | 0 | 0 | 0 | 0 |
| C3 | c11 | c11 | c11 | c11 | c11 | c11 | 0 | 0 | 0 | 0 | 0 | 0 |
| C4 | c12 | c12 | c12 | c12 | c12 | c12 | c12 | 0 | 0 | 0 | 0 | 0 |
| C5 | c13 | c13 | c13 | c13 | c13 | c13 | c13 | c13 | 0 | 0 | 0 | 0 |
| C6 | c14 | c14 | c14 | c14 | c14 | c14 | c14 | c14 | c14 | 0 | 0 | 0 |
| C7 | c7 | c15 | c15 | c15 | c15 | c15 | c15 | c15 | c15 | c15 | 0 | 0 |
| Cn | c8 | c8 | | c16 | c16 | c16 | c16 | c16 | c16 | c16 | c16 | . . . |
| N1 | d9 | d9 | d9 | d9 | 0 | 0 | 0 | 0 | 0 | 0 | 0 | 0 |
| N2 | d10 | d10 | d10 | d10 | d10 | 0 | 0 | 0 | 0 | 0 | 0 | 0 |
| N3 | d11 | d11 | d11 | d11 | d11 | d11 | 0 | 0 | 0 | 0 | 0 | 0 |
| N4 | d12 | d12 | d12 | d12 | d12 | d12 | d12 | 0 | 0 | 0 | 0 | 0 |
| N5 | d13 | d13 | d13 | d13 | d13 | d13 | d13 | d13 | 0 | 0 | 0 | 0 |
| N6 | d14 | d14 | d14 | d14 | d14 | d14 | d14 | d14 | d14 | 0 | 0 | 0 |
| N7 | d7 | d15 | d15 | d15 | d15 | d15 | d15 | d15 | d15 | d15 | 0 | 0 |
| Nn | d8 | d8 | | d16 | d16 | d16 | d16 | d16 | d16 | d16 | d16 | . . . |
| IA | a14 | a15 | . . . | a16 | 0 | 0 | 0 | 0 | 0 | 0 | 0 | . . . |
| OA | a7 | . . . | a8 | a9 | a10 | a11 | a12 | a13 | a14 | a15 | . . . | a16 |
| IB | b14 | b15 | . . . | b16 | 0 | 0 | 0 | 0 | 0 | 0 | 0 | . . . |

TABLE III B – Continued

| | | | | | | | | | | | | |
|---|---|---|---|---|---|---|---|---|---|---|---|---|
| OB | b7 | . . . | b8 | b9 | b10 | b11 | b12 | b13 | b14 | b15 | . . . | b16 |
| IC | c14 | c15 | . . . | c16 | 0 | 0 | 0 | 0 | 0 | 0 | 0 | . . . |
| OC | c7 | . . . | c8 | c9 | c10 | c11 | c12 | c13 | c14 | c15 | . . . | c16 |
| IN | d14 | d15 | . . . | d16 | 0 | 0 | 0 | 0 | 0 | 0 | 0 | . . . |
| ON | d7 | . . . | d8 | d9 | d10 | d11 | d12 | d13 | d14 | d15 | . . . | d16 |

Figure 4:
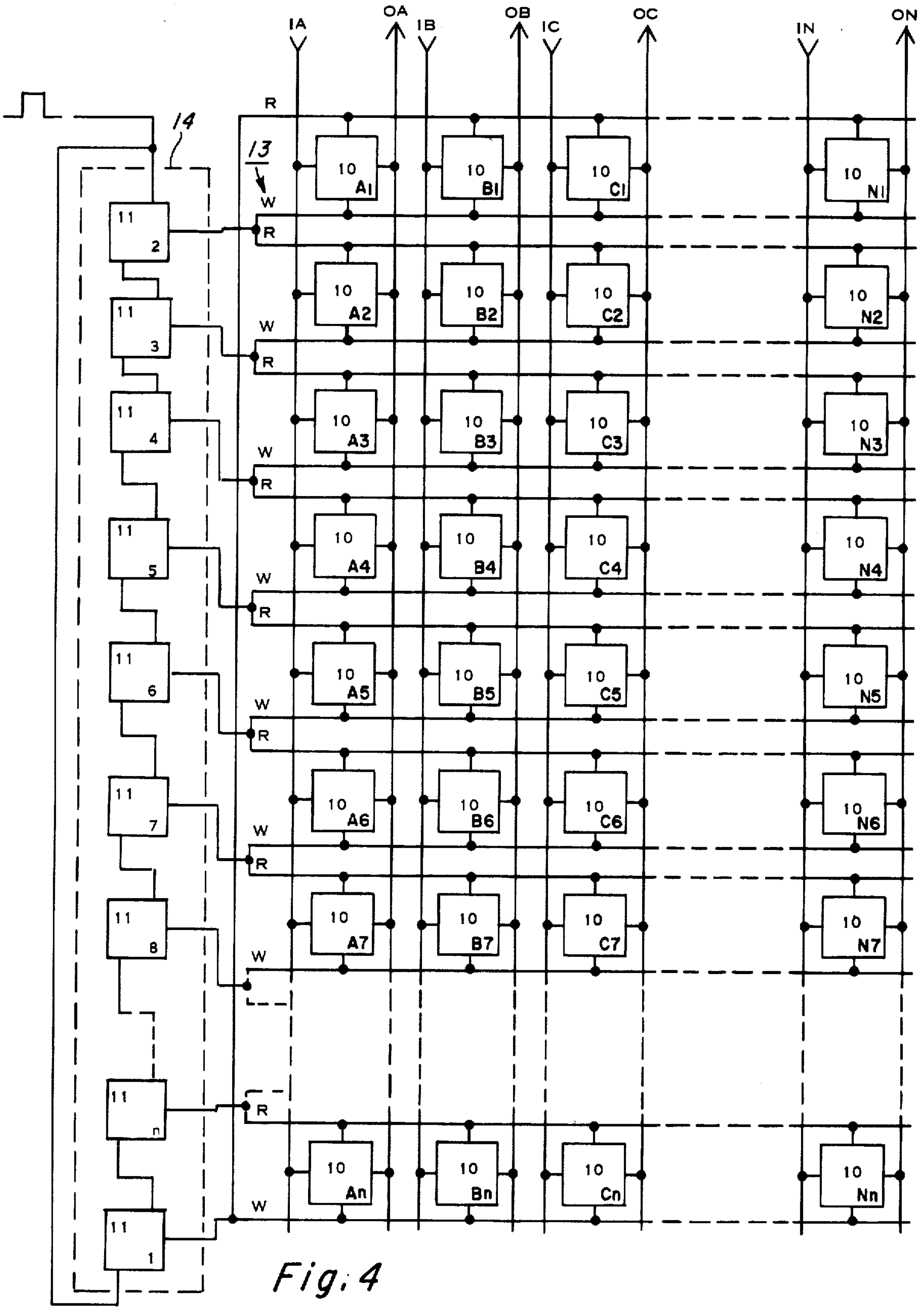

In the embodiment of FIG. 3, the pulse first being introduced into the 1st shift register cell provides an output from the memory cells of row 1 and the storage of input information in row *n*. Thus, there is no time period delay before information is read into the shift register system. Shift register cells 11 of commutator 14 may nevertheless be rearranged (similarly to FIG. 2) in a fourth embodiment illustrated in FIG. 4, so that information is written into the first row rather than the fourth row during the first time period. In order to accomplish this, the commutator input pulse is first applied to shift register cell 2 and lastly to shift register cell 1 before recirculating the pulse to shift register cell 2. The operation of this fourth embodiment of the shift register system for time periods 1 through 3*n* is shown in TABLES IV A and B.

Figure 5:
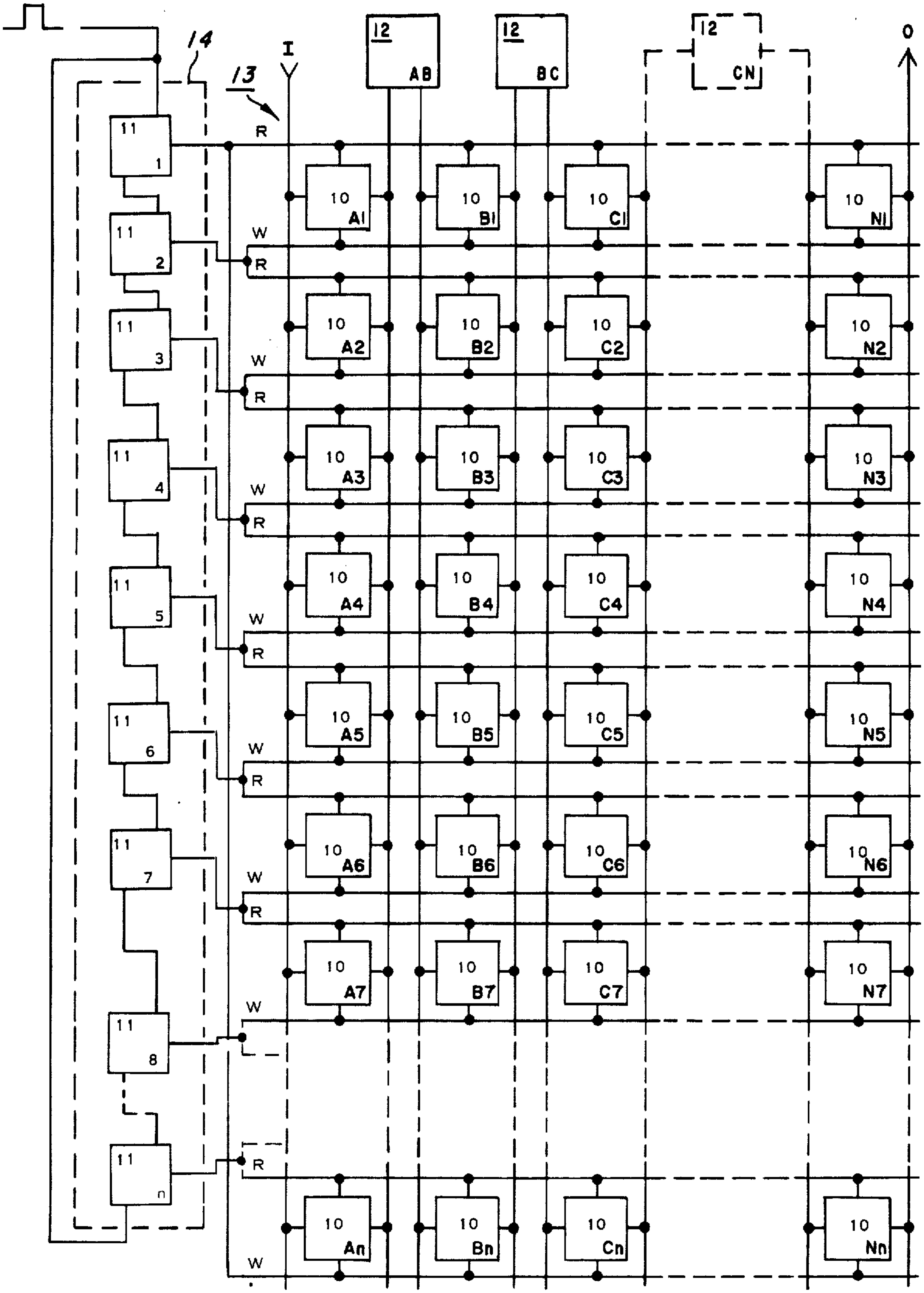

Referring to FIG. 5, a fifth embodiment of the shift register system of the invention is shown which stores and shifts N × *n* bits of coded information. In this embodiment, a single series of bits is introduced into the input means I of column A during time periods 2 through N × *n*+1 and the series of bits is provided at output line O of the N th column during time periods (N × *n*)+1 through 2N × *n*. Again, the shift register system is comprised of random access memory 13 having *n* rows (1, 2, 3, 4, 5, 6, 7, ..., *n*) and N columns (A, B, C, ..., N) of random access memory cells. The common input means I of column A provides means for inputting the coded information into the shift register system and the output means O of column N provides means for outputting the coded information from the shift register system. In addition, the output means of column A is coupled to the input means of column B by a storage or delay cell 12 (AB), the output means of column B is coupled to the input means of column C by a storage cell 12 (BC), etc.

TABLE IV A

| | t- | 1 | 2 | 3 | 4 | 5 | 6 | 7 | . . . n−1 | n | n+1 | n+2 | n+3 | n+4 | n+5 | n+6 |
|---|---|---|---|---|---|---|---|---|---|---|---|---|---|---|---|---|
| 11 | 2 | 1 | | | | | | | | | | | | | | |
| | 3 | | 1 | | | | | | | | | 1 | | | | |
| | 4 | | | 1 | | | | | | | | | 1 | | | |
| | 5 | | | | 1 | | | | | | | | | 1 | | |
| | 6 | | | | | 1 | | | | | | | | | 1 | |
| | 7 | | | | | | 1 | | | | | | | | | 1 |
| | n | | | | | | | | 1 | | | | | | | |
| | 1 | | | | | | | | | 1 | | | | | | |
| 10 | A1 | a1 | a1 | a1 | a1 | a1 | a1 | a1 | a1 | a1 | a9 | a9 | a9 | a9 | a9 | a9 |
| | A2 | | a2 | a2 | a2 | a2 | a2 | a2 | a2 | a2 | a2 | a10 | a10 | a10 | a10 | a10 |
| | A3 | | | a3 | a3 | a3 | a3 | a3 | a3 | a3 | a3 | a3 | a11 | a11 | a11 | a11 |
| | A4 | | | | a4 | a4 | a4 | a4 | a4 | a4 | a4 | a4 | a4 | a12 | a12 | a12 |
| | A5 | | | | | a5 | a5 | a5 | a5 | a5 | a5 | a5 | a5 | a5 | a13 | a13 |
| | A6 | | | | | | a6 | a6 | a6 | a6 | a6 | a6 | a6 | a6 | a6 | a14 |
| | A7 | | | | | | | a7 | a7 | a7 | a7 | a7 | a7 | a7 | a7 | a7 |
| | An | | | | | | | | . . . | a8 | a8 | a8 | a8 | a8 | a8 | a8 |
| | B1 | b1 | b1 | b1 | b1 | b1 | b1 | b1 | b1 | b1 | b9 | b9 | b9 | b9 | b9 | b9 |
| | B2 | | b2 | b2 | b2 | b2 | b2 | b2 | b2 | b2 | b2 | b10 | b10 | b10 | b10 | b10 |
| | B3 | | | b3 | b3 | b3 | b3 | b3 | b3 | b3 | b3 | b3 | b11 | b11 | b11 | b11 |
| | B4 | | | | b4 | b4 | b4 | b4 | b4 | b4 | b4 | b4 | b4 | b12 | b12 | b12 |
| | B5 | | | | | b5 | b5 | b5 | b5 | b5 | b5 | b5 | b5 | b5 | b13 | b13 |
| | B6 | | | | | | b6 | b6 | b6 | b6 | b6 | b6 | b6 | b6 | b6 | b14 |
| | B7 | | | | | | | b7 | b7 | b7 | b7 | b7 | b7 | b7 | b7 | b7 |
| | Bn | | | | | | | | . . . | b8 | b8 | b8 | b8 | b8 | b8 | b8 |
| | C1 | | c1 | c1 | c1 | c1 | c1 | c1 | c1 | c1 | c1 | c9 | c9 | c9 | c9 | c9 |
| | C2 | | c2 | c2 | c2 | c2 | c2 | c2 | c2 | c2 | c2 | c10 | c10 | c10 | c10 | c10 |
| | C3 | | | c3 | c3 | c3 | c3 | c3 | c3 | c3 | c3 | c3 | c11 | c11 | c11 | c11 |
| | C4 | | | | c4 | c4 | c4 | c4 | c4 | c4 | c4 | c4 | c4 | c12 | c12 | c12 |
| | C5 | | | | | c5 | c5 | c5 | c5 | c5 | c5 | c5 | c5 | c5 | c13 | c13 |
| | C6 | | | | | | c6 | c6 | c6 | c6 | c6 | c6 | c6 | c6 | c6 | c14 |
| | C7 | | | | | | | c7 | c7 | c7 | c7 | c7 | c7 | c7 | c7 | c7 |
| | Cn | | | | | | | | . . . | c8 | c8 | c8 | c8 | c8 | c8 | c8 |
| | N1 | d1 | d1 | d1 | d1 | d1 | d1 | d1 | d1 | d1 | d9 | d9 | d9 | d9 | d9 | d9 |
| | N2 | | d2 | d2 | d2 | d2 | d2 | d2 | d2 | d2 | d2 | d10 | d10 | d10 | d10 | d10 |
| | N3 | | | d3 | d3 | d3 | d3 | d3 | d3 | d3 | d3 | d3 | d11 | d11 | d11 | d11 |
| | N4 | | | | d4 | d4 | d4 | d4 | d4 | d4 | d4 | d4 | d4 | d12 | d12 | d12 |
| | N5 | | | | | d5 | d5 | d5 | d5 | d5 | d5 | d5 | d5 | d5 | d13 | d13 |
| | N6 | | | | | | d6 | d6 | d6 | d6 | d6 | d6 | d6 | d6 | d6 | d14 |
| | N7 | | | | | | | d7 | d7 | d7 | d7 | d7 | d7 | d7 | d7 | d7 |
| | Nn | | | | | | | | . . . | d8 | d8 | d8 | d8 | d8 | d8 | d8 |
| | IA | a1 | a2 | a3 | a4 | a5 | a6 | a7 | . . . | a8 | a9 | a10 | a11 | a12 | a13 | a14 |
| | OA | $\phi$ | $\phi$ | $\phi$ | $\phi$ | $\phi$ | $\phi$ | ... | $\phi$ | a1 | a2 | a3 | a4 | a5 | a6 | a7 |
| | IB | b1 | b2 | b3 | b4 | b5 | b6 | b7 | . . . | b8 | b9 | b10 | b11 | b12 | b13 | b14 |
| | OB | $\phi$ | $\phi$ | $\phi$ | $\phi$ | $\phi$ | $\phi$ | ... | $\phi$ | b1 | b2 | b3 | b4 | b5 | b6 | b7 |
| | IC | c1 | c2 | c3 | c4 | c5 | c6 | c7 | . . . | c8 | c9 | c10 | c11 | c12 | c13 | c14 |
| | OC | $\phi$ | $\phi$ | $\phi$ | $\phi$ | $\phi$ | $\phi$ | ... | $\phi$ | c1 | c2 | c3 | c4 | c5 | c6 | c7 |
| | IN | d1 | d2 | d3 | d4 | d5 | d6 | d7 | . . . | d8 | d9 | d10 | d11 | d12 | d13 | d14 |
| | ON | $\phi$ | $\phi$ | $\phi$ | $\phi$ | $\phi$ | $\phi$ | ... | $\phi$ | d1 | d2 | d3 | d4 | d5 | d6 | d7 |

TABLE IV B

| | t- | n+7 | . . . 2n−1 | 2n | 2n+1 | 2n+2 | 2n+3 | 2n+4 | 2n+5 | 2n+6 | 2n+7 | . . . 3n−1 | 3n |
|---|---|---|---|---|---|---|---|---|---|---|---|---|---|
| 11 | 2 | | | | 1 | | | | | | | | |
| | 3 | | | | | 1 | | | | | | | |
| | 4 | | | | | | 1 | | | | | | |
| | 5 | | | | | | | 1 | | | | | |
| | 6 | | | | | | | | 1 | | | | |
| | 7 | | | | | | | | | 1 | | | |
| | n | | 1 | | | | | | | | | 1 | |
| | 1 | | | 1 | | | | | | | | | 1 |
| 10 | A1 | a9 | a9 | a9 | 0 | 0 | 0 | 0 | 0 | 0 | 0 | 0 | 0 |
| | A2 | a10 | a10 | a10 | a10 | 0 | 0 | 0 | 0 | 0 | 0 | 0 | 0 |
| | A3 | a11 | a11 | a11 | a11 | a11 | 0 | 0 | 0 | 0 | 0 | 0 | 0 |
| | A4 | a12 | a12 | a12 | a12 | a12 | a12 | 0 | 0 | 0 | 0 | 0 | 0 |
| | A5 | a13 | a13 | a13 | a13 | a13 | a13 | a13 | 0 | 0 | 0 | 0 | 0 |
| | A6 | a14 | a14 | a14 | a14 | a14 | a14 | a14 | a14 | 0 | 0 | 0 | 0 |
| | A7 | a15 | a15 | a15 | a15 | a15 | a15 | a15 | a15 | a15 | 0 | 0 | 0 |
| | An | a8 | a8 | a16 | a16 | a16 | a16 | a16 | a16 | a16 | a16 | a16 | 0 |
| | B1 | b9 | b9 | b9 | 0 | 0 | 0 | 0 | 0 | 0 | 0 | 0 | 0 |
| | B2 | b10 | b10 | b10 | b10 | 0 | 0 | 0 | 0 | 0 | 0 | 0 | 0 |
| | B3 | b11 | b11 | b11 | b11 | b11 | 0 | 0 | 0 | 0 | 0 | 0 | 0 |
| | B4 | b12 | b12 | b12 | b12 | b12 | b12 | 0 | 0 | 0 | 0 | 0 | 0 |
| | B5 | b13 | b13 | b13 | b13 | b13 | b13 | b13 | 0 | 0 | 0 | 0 | 0 |
| | B6 | b14 | b14 | b14 | b14 | b14 | b14 | b14 | b14 | 0 | 0 | 0 | 0 |
| | B7 | b7 | b15 | b15 | b15 | b15 | b15 | b15 | b15 | b15 | 0 | 0 | 0 |
| | Bn | b8 | b8 | b16 | b16 | b16 | b16 | b16 | b16 | b16 | b16 | b16 | 0 |
| | C1 | c9 | c9 | c9 | 0 | 0 | 0 | 0 | 0 | 0 | 0 | 0 | 0 |
| | C2 | c10 | c10 | c10 | c10 | 0 | 0 | 0 | 0 | 0 | 0 | 0 | 0 |
| | C3 | c11 | c11 | c11 | c11 | c11 | 0 | 0 | 0 | 0 | 0 | 0 | 0 |
| | C4 | c12 | c12 | c12 | c12 | c12 | c12 | 0 | 0 | 0 | 0 | 0 | 0 |
| | C5 | c13 | c13 | c13 | c13 | c13 | c13 | c13 | 0 | 0 | 0 | 0 | 0 |
| | C6 | c14 | c14 | c14 | c14 | c14 | c14 | c14 | c14 | 0 | 0 | 0 | 0 |
| | C7 | c7 | c15 | c15 | c15 | c15 | c15 | c15 | c15 | c15 | 0 | 0 | 0 |
| | Cn | c8 | c8 | c16 | c16 | c16 | c16 | c16 | c16 | c16 | c16 | c16 | 0 |
| | N1 | d9 | d9 | d9 | 0 | 0 | 0 | 0 | 0 | 0 | 0 | 0 | 0 |
| | N2 | d10 | d10 | d10 | d10 | 0 | 0 | 0 | 0 | 0 | 0 | 0 | 0 |
| | N3 | d11 | d11 | d11 | d11 | d11 | 0 | 0 | 0 | 0 | 0 | 0 | 0 |
| | N4 | d12 | d12 | d12 | d12 | d12 | d12 | 0 | 0 | 0 | 0 | 0 | 0 |
| | N5 | d13 | d13 | d13 | d13 | d13 | d13 | d13 | 0 | 0 | 0 | 0 | 0 |
| | N6 | d14 | d14 | d14 | d14 | d14 | d14 | d14 | 0 | 0 | 0 | 0 | |
| | d14 | | | | | | | | | | | | |
| | N7 | d7 | d15 | d15 | d15 | d15 | d15 | d15 | d15 | d15 | 0 | 0 | 0 |
| | Nn | d8 | d8 | d16 | d16 | d16 | d16 | d16 | d16 | d16 | d16 | d16 | 0 |
| | IA | a15 | . . . | a16 | 0 | 0 | 0 | 0 | 0 | 0 | 0 | . . . | 0 |
| | OA | . . . | a8 | a9 | a10 | a11 | a12 | a13 | a14 | a15 | . . . | a16 | 0 |
| | IB | b15 | . . . | b16 | 0 | 0 | 0 | 0 | 0 | 0 | 0 | . . . | 0 |
| | OB | . . . | b8 | b9 | b10 | b11 | b12 | b13 | b14 | b15 | . . . | b16 | 0 |
| | IC | C15 | . . . | c16 | 0 | 0 | 0 | 0 | 0 | 0 | 0 | . . . | 0 |
| | OC | . . . | c8 | c9 | c10 | c11 | c12 | c13 | c14 | c15 | . . . | c16 | 0 |
| | IN | d15 | . . . | d16 | 0 | 0 | 0 | 0 | 0 | 0 | 0 | . . . | 0 |
| | ON | . . . | d8 | d8 | d10 | d11 | d12 | d13 | d14 | d15 | . . . | d16 | 0 |

In order to better understand the operation of this shift register embodiment, a shift register system of this type comprised of a 4 × 4 cell random access array illustrated in FIG. 5A will be discussed rather than the N × *n* embodiment of FIG. 5. In the first time period a bit of coded information is read from memory cell D1 at output O and bits of coded information are transferred from memory cells A1, B1 and C1 into storage cells AB, BC and CD, respectively while simultaneously bits of coded information previously stored in storage cells AB, BC and CD are written into memory cells B4, C4 and D4, respectively and a new bit of coded information introduced at input line I is written into memory cell A4. In the second time period a bit of coded information is read from memory cell D2 at output O and bits of coded information are transferred from memory cells A2, B2 and C2 into storage cells AD, BC and CD, respectively while simultaneously the bits of coded information stored in storage cells AB, BC and CD during the first time period are written into memory cells B1, C1 and D1, respectively and a new bit of coded information introduced at input line I is written into memory cell A1 and so forth. The operation of the shift register system of FIG. 5 over many time periods is shown in TABLES V A and B. TABLES V A and B show the states of shift register cells 11, the state of memory cells 10, the information introduced at input line I and the information provided at output line O for time periods 1 through 30.

Figure 2:
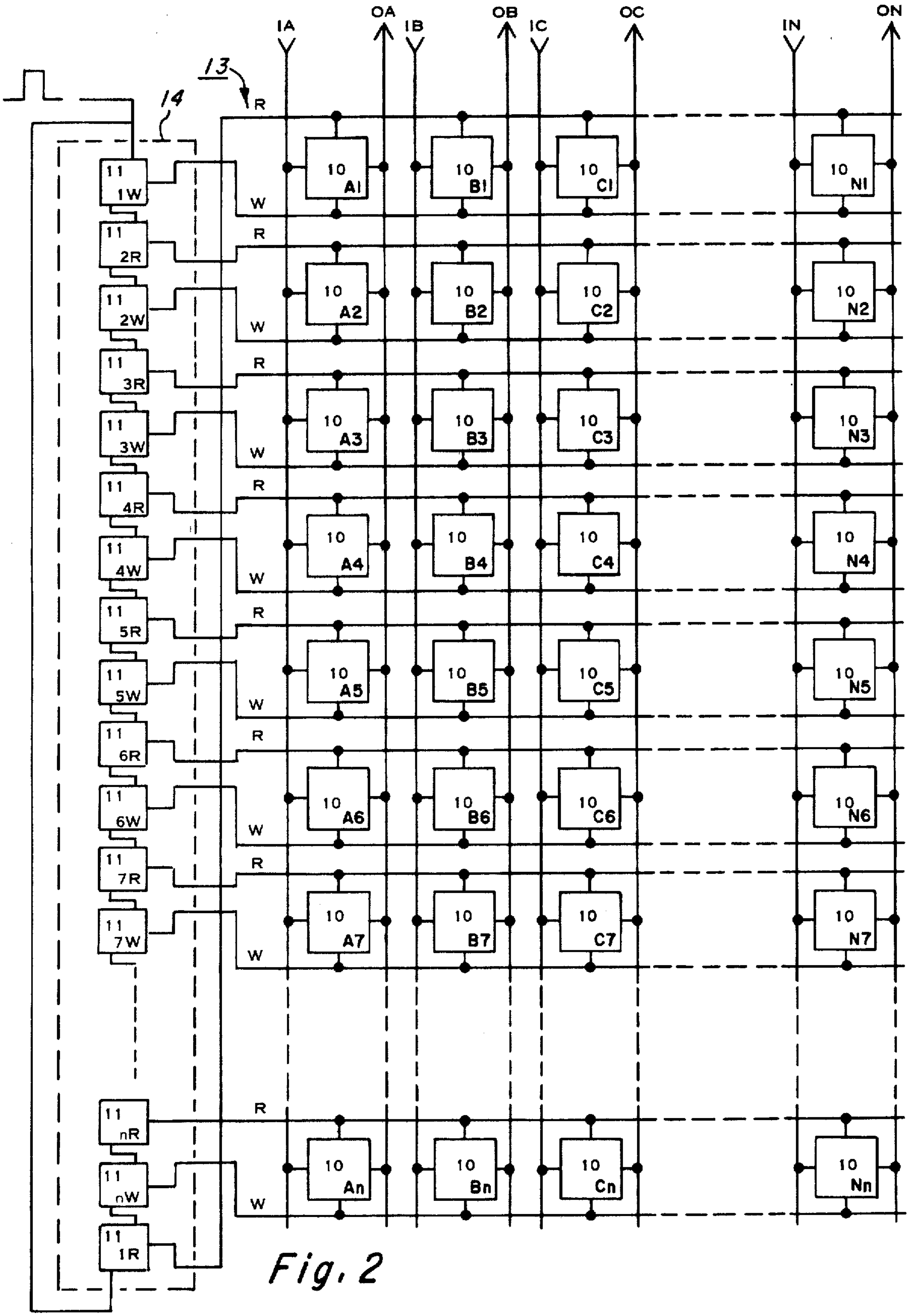
Figure 5A:
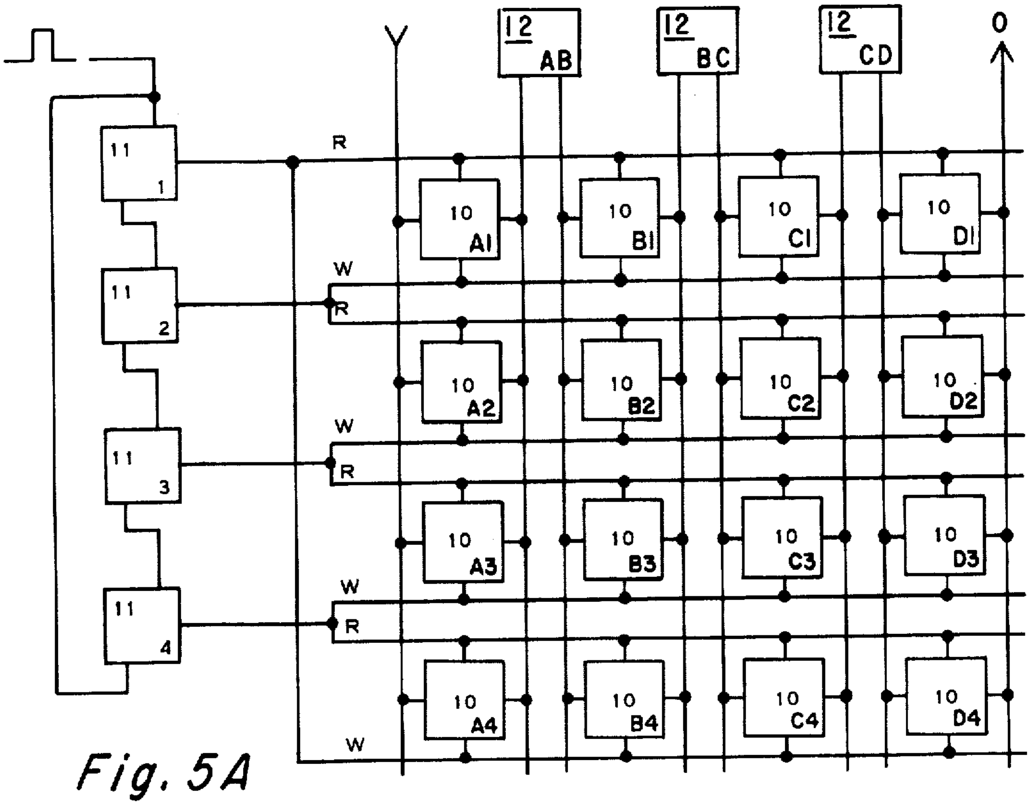

In the embodiments of FIGS. 5 and 5A the read control lines of the rows of memory cells are commoned with the write control lines of adjacent rows of memory cells in a manner similar to the embodiment of FIG. 2. It should be noted, however, that the commutator arrangement of FIG. 1 may be utilized in the embodiment of FIG. 5 and 5A to provide another shift register system embodiment. Also, the pulse first being

TABLE V A

| | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 11 | 1 | 1 | | | | 1 | | | | 1 | | | | 1 | | |
| | 2 | | 1 | | | | 1 | | | | 1 | | | | 1 | |
| | 3 | | | 1 | | | | 1 | | | | 1 | | | | 1 |
| | 4 | | | | 1 | | | | 1 | | | | 1 | | | |
| 10 | A1 | a1 | a1 | a1 | a1 | a5 | a5 | a5 | a5 | a9 | a9 | a9 | a9 | a13 | a13 | |
| | A2 | | | a2 | a2 | a2 | a2 | a6 | a6 | a6 | a6 | a10 | a10 | a10 | a10 | a14 |
| | A3 | | | | a3 | a3 | a3 | a3 | a7 | a7 | a7 | a7 | a11 | a11 | a11 | a11 |
| | A4 | | | | | a4 | a4 | a4 | a4 | a8 | a8 | a8 | a8 | a12 | a12 | a12 |

TABLE V A – Continued

| | | | | | | | | | | | | | | | |
|---|---|---|---|---|---|---|---|---|---|---|---|---|---|---|---|
| | B1 | | | | | a1 | a1 | a1 | a1 | a5 | a5 | a5 | a5 | a9 | a9 |
| | B2 | | | | | | a2 | a2 | a2 | a2 | a6 | a6 | a6 | a6 | a10 |
| | B3 | | | | | | | a3 | a3 | a3 | a3 | a7 | a7 | a7 | a7 |
| | B4 | | | | | | | | a4 | a4 | a4 | a4 | a8 | a8 | a8 |
| | C1 | | | | | | | | | a1 | a1 | a1 | a1 | a5 | a5 |
| | C2 | | | | | | | | | | a2 | a2 | a2 | a2 | a6 |
| | C3 | | | | | | | | | | | a3 | a3 | a3 | a3 |
| | C4 | | | | | | | | | | | | a4 | a4 | a4 |
| | D1 | | | | | | | | | | | | | a1 | a1 |
| | D2 | | | | | | | | | | | | | | a2 |
| | D3 | | | | | | | | | | | | | | |
| | D4 | | | | | | | | | | | | | | |
| 12 | AB | | | | a1 | a2 | a3 | a4 | a5 | a6 | a7 | a8 | a9 | a10 | a11 |
| | BC | | | | | | | | a1 | a2 | a3 | a4 | a5 | a6 | a7 |
| | CD | | | | | | | | | | | | a1 | a2 | a3 |
| | I | a1 | a2 | a3 | a4 | a5 | a6 | a7 | a8 | a9 | a10 | a11 | a12 | a13 | a14 |

TABLE V B

| | | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|
| 11 | 1 | | 1 | | | | 1 | | | | 1 | | | | 1 | |
| | 2 | | | 1 | | | | 1 | | | | 1 | | | | 1 |
| | 3 | | | | 1 | | | | 1 | | | | 1 | | | |
| | 4 | 1 | | | | 1 | | | | 1 | | | | 1 | | |
| | A1 | a13 | a13 | a17 | a17 | a17 | a17 | a21 | a21 | a21 | a21 | a25 | a25 | a25 | a25 | a29 |
| | A2 | a14 | a14 | a14 | a18 | a18 | a18 | a18 | a22 | a22 | a22 | a22 | a26 | a26 | a26 | a26 |
| | A3 | a15 | a15 | a15 | a15 | a19 | a19 | a19 | a19 | a23 | a23 | a23 | a23 | a27 | a27 | a27 |
| | A4 | a12 | a16 | a16 | a16 | a16 | a20 | a20 | a20 | a20 | a24 | a24 | a24 | a24 | a28 | a28 |
| | B1 | a9 | a9 | a13 | a13 | a13 | a13 | a17 | a17 | a17 | a17 | a21 | a21 | a21 | a21 | a25 |
| | B2 | a10 | a10 | a10 | a14 | a14 | a14 | a14 | a18 | a18 | a18 | a18 | a22 | a22 | a22 | a22 |
| | B3 | a11 | a11 | a11 | a11 | a15 | a15 | a15 | a15 | a19 | a19 | a19 | a19 | a23 | a23 | a23 |
| | B4 | a8 | a12 | a12 | a12 | a12 | a16 | a16 | a16 | a16 | a20 | a20 | a20 | a20 | a24 | a24 |
| | C1 | a5 | a5 | a9 | a9 | a9 | a9 | a13 | a13 | a13 | a13 | a17 | a17 | a17 | a17 | a21 |
| | C2 | a6 | a6 | a6 | a10 | a10 | a10 | a10 | a14 | a14 | a14 | a14 | a18 | a18 | a18 | a18 |
| | C3 | a7 | a7 | a7 | a7 | a11 | a11 | a11 | a11 | a15 | a15 | a15 | a15 | a19 | a19 | a19 |
| | C4 | a4 | a8 | a8 | a8 | a8 | a12 | a12 | a12 | a12 | a16 | a16 | a16 | a16 | a20 | a20 |
| | D1 | a1 | a1 | a5 | a5 | a5 | a5 | a9 | a9 | a9 | a9 | a13 | a13 | a13 | a13 | a17 |
| | D2 | a2 | a2 | a2 | a6 | a6 | a6 | a6 | a10 | a10 | a10 | a10 | a14 | a14 | a14 | a14 |
| | D3 | a3 | a3 | a3 | a3 | a7 | a7 | a7 | a7 | a11 | a11 | a11 | a11 | a15 | a15 | a15 |
| | D4 | | a4 | a4 | a4 | a4 | a8 | a8 | a8 | a8 | a12 | a12 | a12 | a12 | a16 | a16 |
| 12 | AB | a12 | a13 | a14 | a15 | a16 | a17 | a18 | a19 | a20 | a21 | a22 | a23 | a24 | a25 | a26 |
| | BC | a8 | a9 | a10 | a11 | a12 | a13 | a14 | a15 | a16 | a17 | a18 | a19 | a20 | a21 | a22 |
| | CD | a4 | a5 | a6 | a7 | a8 | a9 | a10 | a11 | a12 | a13 | a14 | a15 | a16 | a17 | a18 |
| | I | a15 | a16 | a17 | a18 | a19 | a20 | a21 | a22 | a23 | a24 | a25 | a26 | a27 | a28 | a29 |
| | O | | a1 | a2 | a3 | a4 | a5 | a6 | a7 | a8 | a9 | a10 | a11 | a12 | a13 | a14 |

introduced into the first shift register cell provides an output from memory cell D1 at output O and the storage of a new bit of information in memory cell A4. No time period delay is required before information is read into the shift register system. The shift register cells 11 of commutator 14 may still be rearranged in the same manner illustrated in FIG. 4 to provide further embodiments in which information is written into memory cell A1 rather than memory cell A4 during the first time period. Yet another embodiment extending from the embodiments previously described, is provided by adding columns of memory cells to the embodiment of FIGS. 5 or 5A. For example, considering the shift register system of FIG. 5A, if another 4 × 4 memory cell array identical to the one shown were added to the illustrated 4 × 4 array, such that the commutator operated both arrays simultaneously a parallel 2-bit shift register for storing and shifting 2 sets 16-bits of binary information is thereby provided. If only two columns were added, the two columns being coupled by a storage cell 12, the added section would store and shift 8-bits of information; that is, a bit introduced into the 16-bit array section is outputted 16 time periods later while a bit introduced into the 8-bit section is outputted 8 time periods later. In this manner variable length shift registers are provided within the random access memory array with a single commutator.

Figure 6:
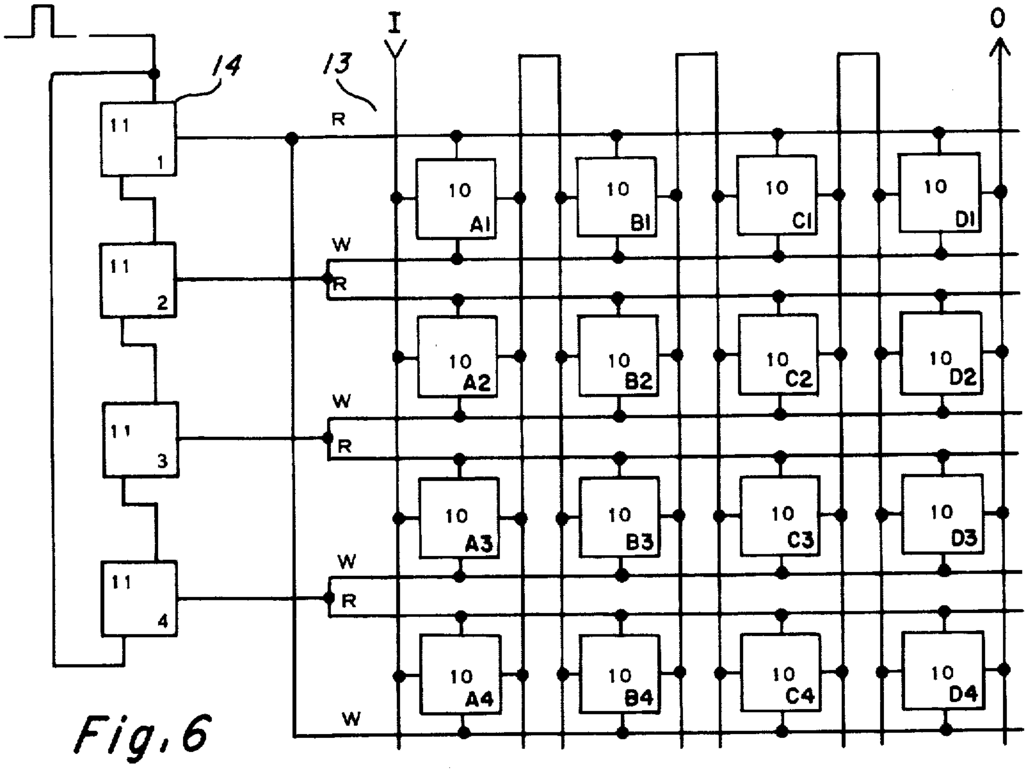

Referring to FIG. 6, a sixth embodiment of the shift register system of the invention is shown which is similar to the embodiment of FIGS. 5 and 5A except that instead of providing storage cells 12 coupling the output means of a column of memory cells 10 with the input means of an adjacent column the output means of a column is commoned with the input means of the next adjacent column. Thus, the output line of column A is common with the input line of column B, the output line of of column B is common with the input line of column C, etc. Although the random access memory array 13 is comprised in general of N × *n* memory cells, in order to provide a better understanding of the operation of this shift register embodiment, an embodiment comprised of a 4 × 4 cell random access memory array, illustrated in FIG. 6, is discussed rather than an N × *n* cell array embodiment. For purposes of illustrating the commoning of the output and input lines of adjacent columns of memory cells, the individual output and input lines of adjacent columns are shown connected together. In a preferred embodiment, however, only a single common output/input line is provided in order to further reduce the size or increase the storage density of the shift register system.

In operation, during the first time period, a bit of coded information introduced at input line I and the bit contents read out of memory cells A1, B1, and C1 are written into memory cells A4, B4, C4 and D4, respectively (as may be seen at time 21 in table VIB); a bit of coded information is simulatneously read out of memory cell D1 which appears on output line O. During the second time period, a bit of coded information introduced at input line I and the bit contents read out of memory cells A2, B2, and C2 are written into memory cells A1, B1, C1 and D1, respectively; a bit of coded information contained in memory cell D2 is simultaneously read out and appears at output O. The differences between this sixth embodiment and the embodiment discussed with respect to FIGS. 5 and and 5A are firstly that no storage cells 12 are required; secondly that the random access memory array portion of the shift register system requires less area because only a single input/output line is required for adjacent columns of memory cells; and thirdly, the length of the shift register, that is, the number of time periods involved between the time a bit of coded information is introduced into input I and the time when the same bit of coded information appears at output O is slightly less for the same size memory array 13.

The operation of the shift register system of FIG. 6 over many time periods is shown in TABLES 6 A and B. TABLES 6 A and B show the states of shift register cells 11, the states memory cells 10, the information introduced at input line I, and the information provided at output line O for time periods 1 through 30.

In the embodiment of FIG. 6, the read control lines of the rows of memory cells 10 are commoned with the write control lines of adjacent memory cells in a similar manner to the embodiment of FIG. 2. It should be noted, however, that the commutator arrangement of FIG. 1 may be utilized in the embodiment of FIG. 6 to provide still another shift register system embodiment. Also, the pulse first being introduced into the first shift register cell provides and output for memory cell D1 at out O and the storage of a new bit of information in memory cell A4; no time period delay is required before information is read into this shift register system embodiment. Shift register cells 11 of commutator 14 may nevertheless be rearranged in the same manner illustrated in FIG. 4 to provide further embodiments in which in formation is written into memory cell A1 rather than memory cell A4 during the first time period. Yet another embodiment is provided by adding columns of memory cells to the embodiment of FIG. 6 as previously described with respect to FIGS. 5 and 5A to provide a shift register system for storing and shifting sets of bits of coded information in parallel or for providing variable length shift register sections within a single shift register system having a single random access memory array and commutator.

TABLE VI A

| | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 11 | 1 | 1 | | | | 1 | | | | 1 | | | | 1 | | |
| | 2 | | 1 | | | | 1 | | | | 1 | | | | 1 | |
| | 3 | | | 1 | | | | 1 | | | | 1 | | | | 1 |
| | 4 | | | | 1 | | | | 1 | | | | 1 | | | |
| 10 | A1 | | a1 | a1 | a1 | a1 | a5 | a5 | a5 | a5 | a9 | a9 | a9 | a9 | a13 | a13 |
| | A2 | | | a2 | a2 | a2 | a2 | a6 | a6 | a6 | a6 | a10 | a10 | a10 | a10 | a14 |
| | A3 | | | | a3 | a3 | a3 | a3 | a7 | a7 | a7 | a7 | a11 | a11 | a11 | a11 |
| | A4 | | | | | a4 | a4 | a4 | a4 | a8 | a8 | a8 | a8 | a12 | a12 | a12 |
| | B1 | | | | | | a2 | a2 | a2 | a2 | a6 | a6 | a6 | a6 | a10 | a10 |
| | B2 | | | | | | | a3 | a3 | a3 | a3 | a7 | a7 | a7 | a7 | a11 |
| | B3 | | | | | | | | a4 | a4 | a4 | a4 | a8 | a8 | a8 | a8 |
| | B4 | | | | | a1 | a1 | a1 | a1 | a5 | a5 | a5 | a5 | a9 | a9 | a9 |
| | C1 | | | | | | | | | | a3 | a3 | a3 | a3 | a7 | a7 |
| | C2 | | | | | | | | | | | a4 | a4 | a4 | a4 | a8 |
| | C3 | | | | | | | | a1 | a1 | a1 | a1 | a5 | a5 | a5 | a5 |
| | C4 | | | | | | | | | a2 | a2 | a2 | a2 | a6 | a6 | a6 |
| | D1 | | | | | | | | | | | | | | a4 | a4 |
| | D2 | | | | | | | | | | | a1 | a1 | a1 | a1 | a5 |
| | D3 | | | | | | | | | | | | a2 | a2 | a2 | a2 |
| | D4 | | | | | | | | | | | | | a3 | a3 | a3 |
| | I | | a1 | a2 | a3 | a4 | a5 | a6 | a7 | a8 | a9 | a10 | a11 | a12 | a13 | a14 |
| | O | | | | | | | | | | | | | | a1 | a2 |

TABLE VI B

| | | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|
| 11 | 1 | | 1 | | | | 1 | | | | 1 | | | | 1 | |
| | 2 | | | 1 | | | | 1 | | | | 1 | | | | 1 |
| | 3 | | | | 1 | | | | 1 | | | | 1 | | | |
| | 4 | 1 | | | | 1 | | | | 1 | | | | 1 | | |
| 10 | A1 | a13 | a13 | a17 | a17 | a17 | a17 | a21 | a21 | a21 | a21 | a25 | a25 | a25 | a25 | a29 |
| | A2 | a14 | a14 | a14 | a18 | a18 | a18 | a18 | a22 | a22 | a22 | a22 | a26 | a26 | a26 | a26 |
| | A3 | a15 | a15 | a15 | a15 | a19 | a19 | a19 | a19 | a23 | a23 | a23 | a23 | a27 | a27 | a27 |
| | A4 | a12 | a16 | a16 | a16 | a16 | a20 | a20 | a20 | a20 | a24 | a24 | a24 | a24 | a28 | a28 |
| | B1 | a10 | a10 | a14 | a14 | a14 | a14 | a18 | a18 | a18 | a18 | a22 | a22 | a22 | a22 | a26 |
| | B2 | a11 | a11 | a11 | a15 | a15 | a15 | a15 | a19 | a19 | a19 | a19 | a23 | a23 | a23 | a23 |
| | B3 | a12 | a12 | a12 | a12 | a16 | a16 | a16 | a16 | a20 | a20 | a20 | a20 | a24 | a24 | a24 |
| | B4 | a9 | a13 | a13 | a13 | a13 | a17 | a17 | a17 | a17 | a21 | a21 | a21 | a21 | a25 | a25 |
| | C1 | a7 | a7 | a11 | a11 | a11 | a11 | a15 | a15 | a15 | a15 | a19 | a19 | a19 | a19 | a23 |
| | C2 | a8 | a8 | a8 | a12 | a12 | a12 | a12 | a16 | a16 | a16 | a16 | a20 | a20 | a20 | a20 |
| | C3 | a9 | a9 | a9 | a9 | a13 | a13 | a13 | a13 | a17 | a17 | a17 | a17 | a21 | a21 | a21 |
| | C4 | a6 | a10 | a10 | a10 | a10 | a14 | a14 | a14 | a14 | a18 | a18 | a18 | a18 | a22 | a22 |
| | D1 | a4 | a4 | a8 | a8 | a8 | a8 | a12 | a12 | a12 | a12 | a16 | a16 | a16 | a16 | a20 |
| | D2 | a5 | a5 | a5 | a9 | a9 | a9 | a9 | a13 | a13 | a13 | a13 | a17 | a17 | a17 | a17 |
| | D3 | a6 | a6 | a6 | a6 | a10 | a10 | a10 | a10 | a14 | a14 | a14 | a14 | a18 | a18 | a18 |
| | D4 | a3 | a7 | a7 | a7 | a7 | a11 | a11 | a11 | a11 | a15 | a15 | a15 | a15 | a19 | a19 |
| | I | a15 | a16 | a17 | a18 | a19 | a20 | a21 | a22 | a23 | a24 | a25 | a26 | a27 | a28 | a29 |
| | O | a3 | a4 | a5 | a6 | a7 | a8 | a9 | a10 | a11 | a12 | a13 | a14 | a15 | a16 | a17 |

Figure 7:
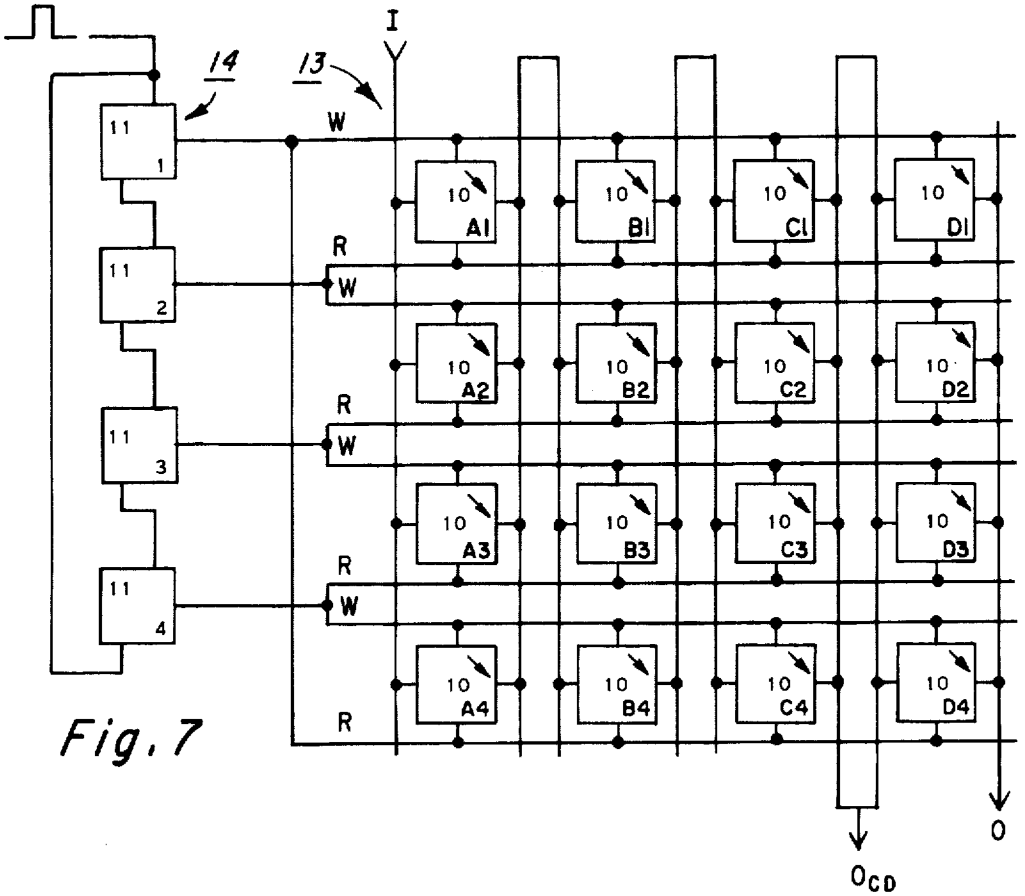

Referring to FIG. 7, a seventh embodiment of the shift register system of the invention is shown which is similar to the embodiment of FIG. 6 in that the output means of a column is commoned with the input means of the next adjacent column. In this seventh embodiment, however, instead of the write control line of the fourth row being coupled to the read control line of the first row, the write control line of the first row being commoned with the read control line of the second row, etc., the read control line of the fourth row is commoned with the write control line of the second row, etc. The results of the commoned read/write lines of this embodiment cause data to flow in the direction of the arrows (shown in the upper right-hand corner of memory cells 10). Data flows through the shift register system in the direction of commutation whereas, in the embodiment of FIG. 6, data flows upwards, i.e., from memory cell A2 to memory cell B1, from memory cell B2 to memory cell C1, etc. which is opposite to the direction of commutation. Outputs such as $O_{CD}$ are provided by the commoned input/output lines of adjacent cells so that the system may be utilizied as a data shifting apparatus in pipeline multipliers.

Figure 8:
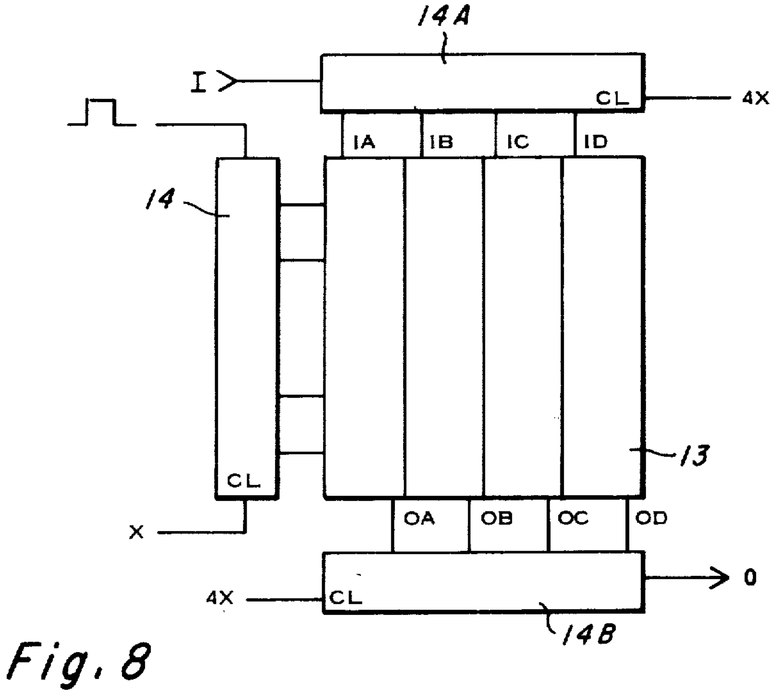

Another embodiment of the shift register system of the invention is a variation of the shift register embodiment of FIGS. 1, 2, 3 or 4. Consider the 4 × 4 random access memory shift register system illustrated in FIG. 8 having random access memory array 13 and commutator system 14. In the embodiments of FIGS. 5 and 5A, the rate at which data flows into input line I and flows out of output line O is dependent upon the rate at which commutator 14 is clocked. Where the shift register is commutator 14 requires a single phase clock, one bit of data is input and one bit of data is output each completes set of phased clock pulses. In the embodiment of FIG. 8, two additional shift registers 14A and 14B have been added to input lines IA, IB, IC and ID and to output lines OA, OB, OC and OD, respectively. The shift register cells of shift registers 14A and 14B may be schematically identical to the shift register cells comprising commutator 14. By clocking shift registers 14A and 14B at a rate of N times the rate at which commutator 14 is clocked, data flows in and out of the resulting shift register system at N times the rate at which data flows in and out of the shift register system embodiments of FIGS. 5 and 5A where the cummutator 14 of FIGS. 5 and 5A are clocked at the same rate as the commutator 14 of FIG. 8. Thus, in the four column embodiment of FIG. 8, where the clock rate of commutator 14 is X and the clock rate of shift registers 14A and 14B are 4X, data is input at terminal I and output from terminal 0 at a rate of 4X. The significance of this embodiment is that random access memory array 13 provides high density bulk storage; and, even if the storage cells of memory array 13 require more time to operate than the shift register cells of shift registers 14A and 14B, the resulting shift register system as far as the data flow rate from input terminal I to output terminal 0 is limited only by the maximum clocking rate of shift registers 14A and 14B.

Figure 9:
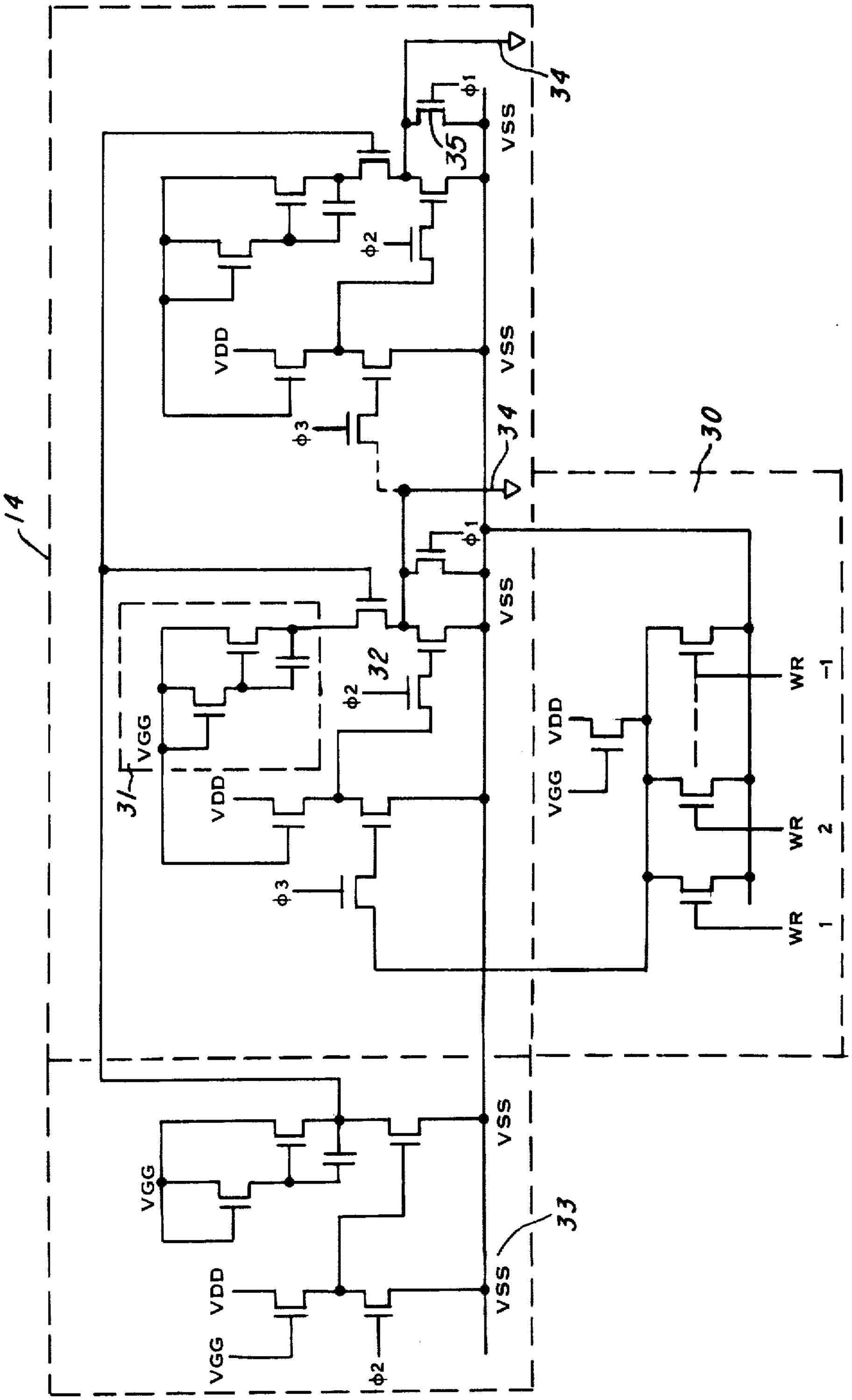
FIG. 9 is a circuit diagram illustrating an MOS or MIS embodiment of commutator 14.

FIG. 9 is a schematic of an MOS commutator system used for mechanizing cell 14 in the embodiments of FIGS. 3, 4, 5, 5A, 6 and 7. In this application the commutator is self-clearing and self-starting by means of the multiple input NOT AND or NAND gate 30. The clearing operation takes a maximum of $n$-1 timing intervals, each timing interval including one each of the three clocks $\phi 1$, $\phi 2$, and $\phi 3$.

The commutator uses a three phase clocking system. The READ/WRITE outputs are active when selected only during the $\phi 2$ and $\phi 3$ period. During the $\phi 1$ period the output is inactive which allows a prechange mechanism the operate in the shift register matrix. During $\phi 2$ period the bootstrap loads 31 are connected to output lines 34 by devices 32 driven by the $\phi 2$ buffer amplifier 33. When $\phi 2$ goes off, the bootstraps 31 becomes disconnected and cease to dissipate power. The output line 34 if it has been selected, will remain active by virtue of stored charge. It will remain active until $\phi 1$ comes on when MOS device 35 becomes conductive and destroys the active state.

The shifting of the active state through this commutator register is accomplished by the $\phi 2$ and $\phi 3$ transfer devices together with the invertors behaving in normal shift register mode.

Figure 10A:
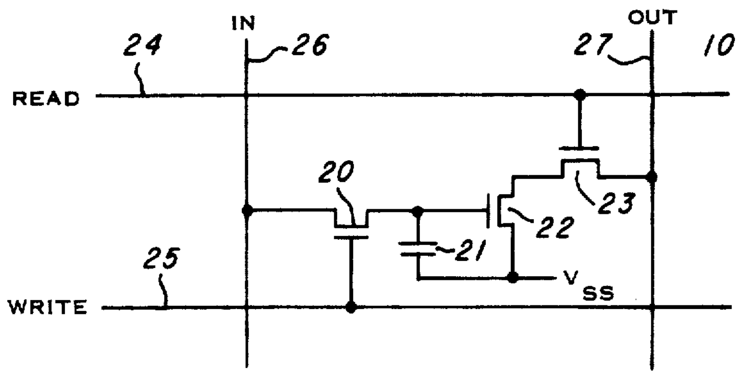

FIG. 10A is a schematic drawing of an MOS random access memory cell 10 used in the embodiments of FIGS. 1 and 2. The operation is as follows: When the WRITE line 25 is activated, MOS device 20 becomes conductive and information present at IN line 26, is transferred to capacitance 21. When the WRITE means becomes inactive, the information previously transferred to capacitance 21 will remain stored for a period dependent only on the capacitance-leakage resistance product of the storage node. This time constant will not be less than the order of one millisecond for MOS fabricated devices under normally expected environmental conditions. MOS device 22 will be either conductive or non-conductive dependent on the state of the information stored. When the READ means 24 is activated, MOS device 23 becomes conductive and consequently the state of the information present in capacitance 21 may be determined by measuring the presence or absence of a conduction both from output line 27 to $V_{SS}$ through deives 22 and 23.

Data input line 26 may be activated by a normal ratio type MOS element or a precharge/discharge type of element.

The data output line 27 may go to a current sensing device or become the driver path of an MOS ratio element or the discharge path in a precharge/discharge/-MOS element.

Figure 10B:
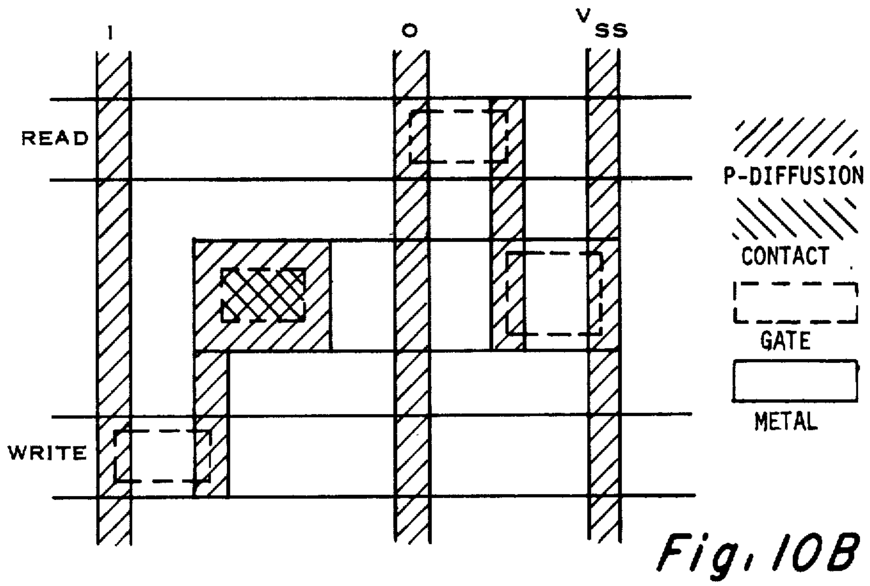

FIG. 10B shows the physical MOS layout for the schematic of FIG. 10A.

Figure 11A:
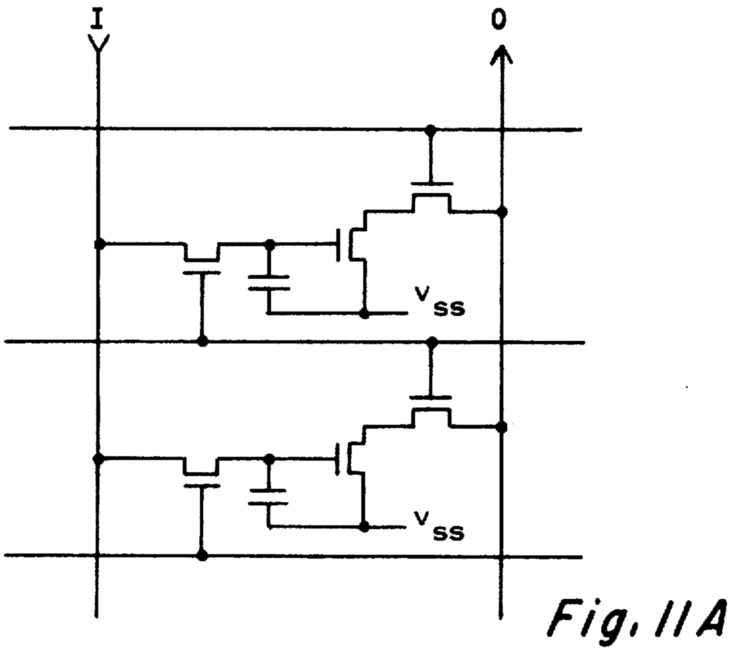
Figure 11B:
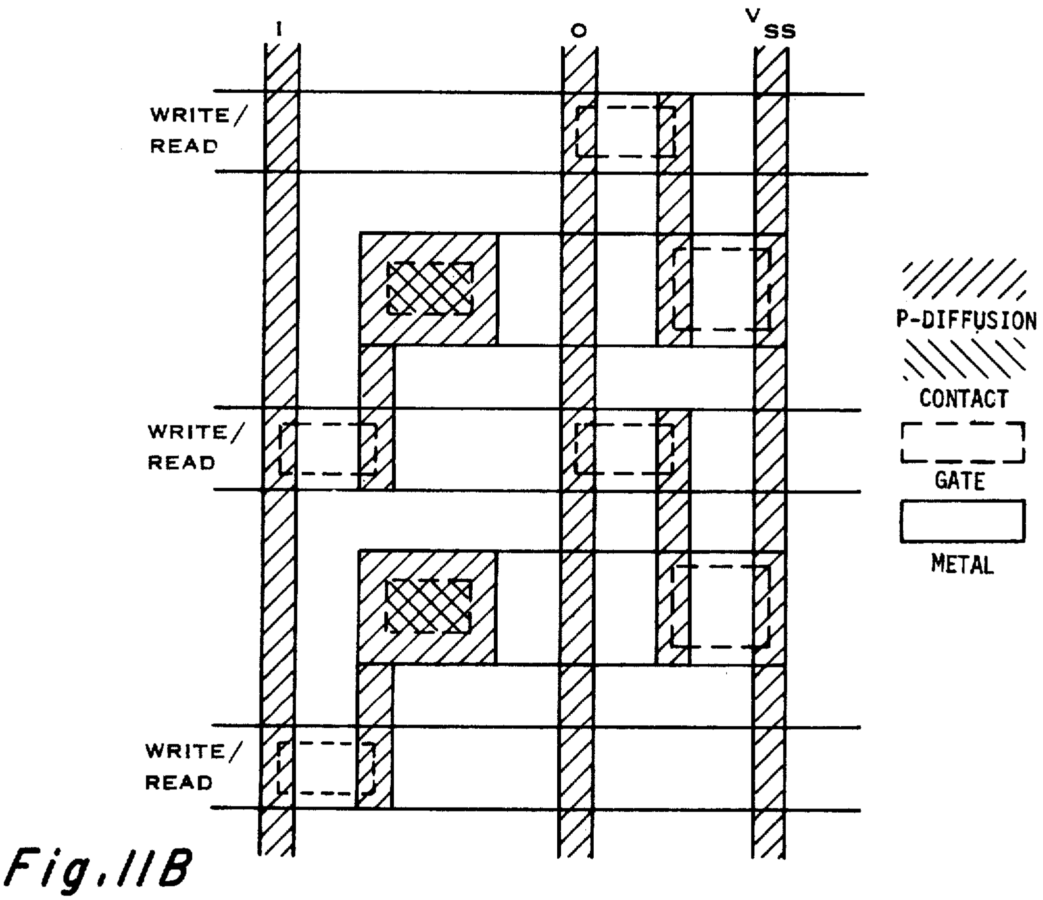

FIG. 11A is a schematic of two adjacent cells of type 10 as used in the embodiments of FIGS. 3, 4, 5, and 5A. The basis of operation is similar to the cell described in FIGS. 10A and 10B. The write lines of one cell have been commoned with the read line of the next adjacent cell. The consequent reduction in layout area can be seen by comparing the single cell of FIG. 10B with the pair of cells in FIG. 11B.

In operation, the cell fits the embodiments of FIGS. 3, 4, 5, and 5A since a write in one cells occurs simultaneously with the read of the adjacent cell with which the address line is shared.

The input and output drive and sense requirements are indentical to those described for FIGS. 10A and 10B.

Figure 12A:
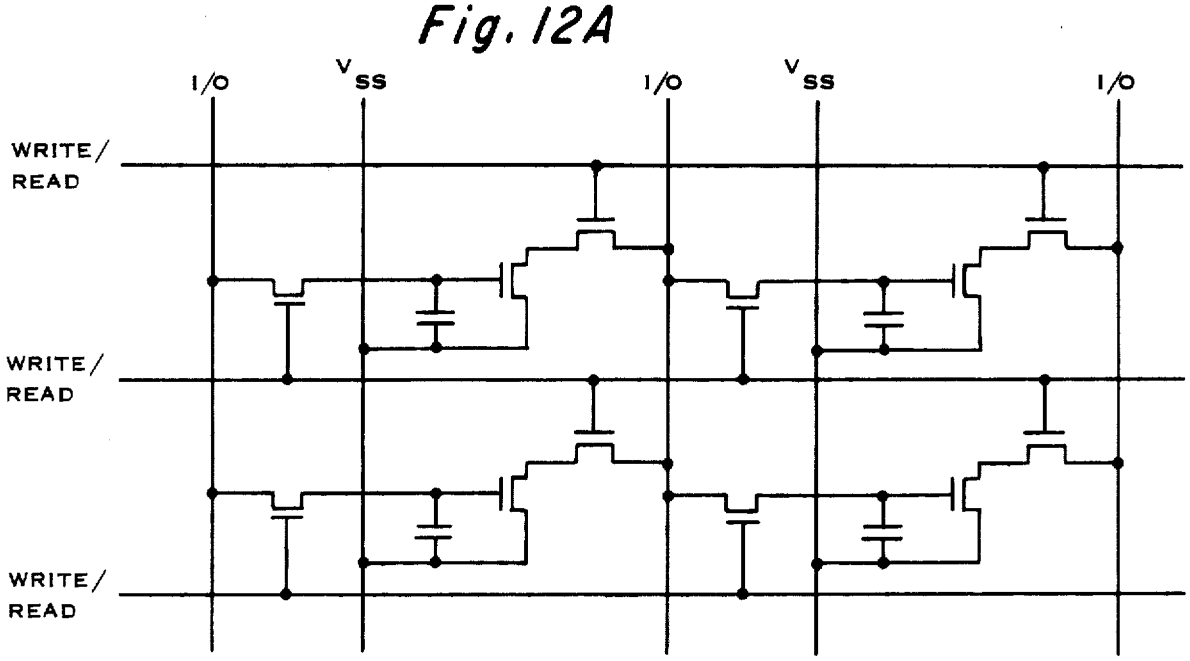

FIG. 12A is a schematic of four MOS memory cells of type 10 used in the embodiments of FIGS. 6 and 7.

Figure 12B:
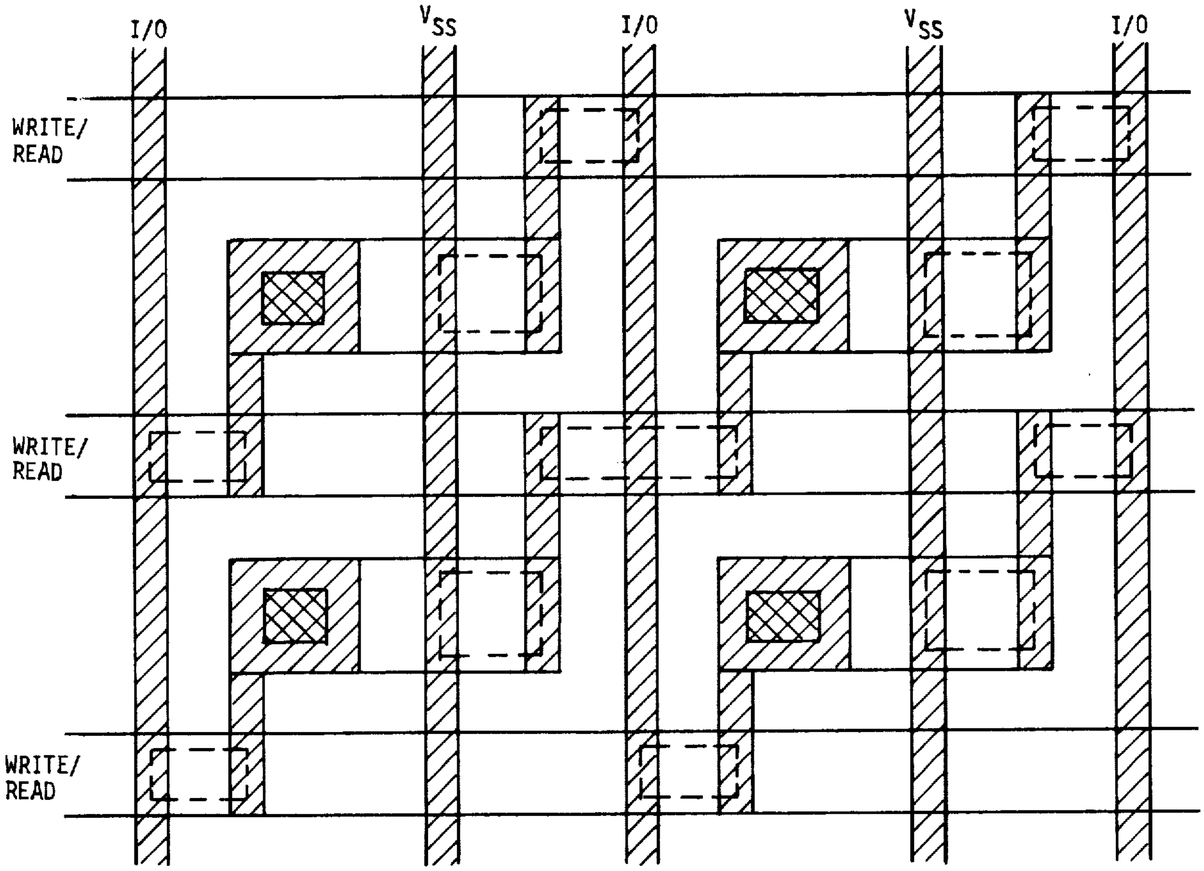

Here the output line of each cell is made common with the input line of the next adjacent cell shown to the right. FIG. 12B shows the physical MOS layout. It can be seen that this cell is yet again reduced compared with the cell of FIG. 11B. The I/O lines in a matrix constructed in this manner are connected to a load or precharge means in order to create voltage levels for writing from presence or absence of conduction in the cell being read.

FIG. 13 is a schematic of an MOS configuration of cell 12 used in the embodiments of FIGS. 5 and 5A. It is a one bit delay of the type used in conventional shift registers.

In the above MOS circuits fabricated on a P channel process $V_{SS}$ is for example +8.0 volts, $V_{DD}$ is for example ground and $V_{GG}$ is for example −8.0 volts. The clocks are considered −4.0 to −5.0 volts.

The operation of a shift register system according to the present invention in a calculator system is described in detail in copending patent application Ser. No. 163,565, now abandoned, refiled Dec. 3, 1973 as continuing application Ser. No. 420,999 filed of even date with the present application by Boone, et al., titled Variable Function Programmed Calculator. Patent application Ser. No. 163,565 (now 420,999) illustrates one manner of using the invention, and the description therein of the data registers particularly at FIGS. 17B, 17F, 17J and related text and figures is hereby incorporated by reference.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

I claim:

1. A shift register system comprising:
a. an array of random access memory cells arranged in rows and columns with the cells of a column having separate input and output lines common to all cells in a column; and
b. commutator means effective to provide a continuous sequence of read/write signals coupled to said array for sequentially reading rows of said memory cells and simultaneously writing information into adjacent rows of memory cells via common read/write lines whereby coded information is stored in said array delayed by a selected number of time periods.

2. The shift register system of claim 1 wherein each row of memory cells includes write address means for storing coded information into the row of memory cells and read address means for reading stored coded information out of said memory cells; and wherein the read address means of the first row is commoned with the write address means of the last row of said array and the read address means of intermediate rows are commoned with the write address means of adjacent rows.

3. The shift register system of claim 1 wherein said commutator means is comprised of a plurality of series coupled shift register cells.

4. The shift register system of claim 1, wherein the number of time periods of delay is equal to the number of series coupled shift register cells.

5. The shift register system of claim 4 wherein the number of shift register cells is equal to the number of rows of memory cells in said memory array.

6. A data memory system comprising:
a. an array of random access memory cells arranged in rows and columns with the cells of a column having separate input and output lines common to all cells in a column; each cell having a read control input and a write control input;
b. a plurality of address lines connected to the rows of cells wherein each address line within the array is connected in common to all of the read control inputs of all cells in a row and also connected to all of the write control inputs of all cells in an adjacent row; and
c. address signal generator means producing a repeating sequence of separate addresses connected to the address lines for sequentially addressing the rows of cells, thereby sequentially reading rows of memory cells and simultaneously writing information into adjacent rows.

7. A shift register system comprising:
a. An array having a plurality of memory cells arranged in rows and columns, each row having write address means for storing coded information into the row of memory cells and read address means for reading stored coded information out of said memory cells; and
b. commutator means selectively coupled to said write and read address means for distributing address signals to the read address means and then to the write address means of each row of cells in sequence whereby coded information is stored in said memory array and then read out of said memory array delayed by a selected number of time periods; wherein
c. read address means of the first row of memory cells is commoned with the write address means of the last row of memory cells and the read address means of intermediate rows are commoned with the write address means of adjacent rows of said memory cells.

8. The shift register system of claim 7 wherein the number of time periods of delay is equal to the number of rows of memory cells in the array.

9. The shift register system of claim 7 wherein said commutator means is composed of a plurality of series coupled shift register cells, each shift register providing one time period of delay.

10. The shift register system of claim 9 wherein one shift register cell is provided for each commoned/write address means to which such shift register cells are respectively coupled.

11. A shift register system comprising:
a. An array having a plurality of memory cells, each of said memory cells including:
i. input means for introducing coded information into the memory cell,
ii. output means for reading information out of the memory cells,
iii. write control means for addressing the memory cell in order to store information in the memory cell, and
iv. read control means for addressing the memory cell in order to read information out of the memory cell, said memory cells arranged in rows and columns, each having i. write address means coupled to each of the write control means of the cells in the respective row, and ii. read address means coupled to each of the read control means of the cells in the respective row, and each column having i. a column input means coupled to the input means of each memory cell in the respective column, and ii. a column output means coupled to the output means of each memory cell in the respective column; and b. commutator means coupled to the read and write address means of said rows of memory cells for selectively read and write addressing said rows of memory cells whereby information is stored in said memory array and is read out of said memory array delayed by a selected number of time periods, wherein c. the read address means of the first row of memory cells is commoned with the write address means of the last row of memory cells and the read address means of intermediate rows are commoned with the write address means of the adjacent rows of said memory cells.

12. The shift register system of claim 11 including means commoning the column output means of the 1st to ($n$-1)th columns with the column input means of the 2nd to $n$th columns, respectively.

13. The shift register system of claim 11 where in said commutator means is comprised of a plurality of series coupled shift register cells.

14. The shift register system of claim 11 wherein said commutator means provides means for sequentially distributing address signals to the commoned read/-write address means of each row of cells in sequence whereby coded information is stored in said memory array and then read out of said memory array delayed by a selected number of time periods.

15. The shift register system of claim 14 wherein said commutator means is compries of a plurality of series coupled shift register cells, each shift register cell providing one time period of delay.

16. The shift register system of claim 15 wherein one shift register cell is provided for each common read/-write address means to which such shift register cells are respectively coupled.

* * * * *